United States Patent
Chen et al.

(10) Patent No.: US 10,354,204 B2
(45) Date of Patent: Jul. 16, 2019

(54) MACHINE LEARNING PREDICTIVE LABELING SYSTEM

(71) Applicant: SAS Institute Inc., Cary, NC (US)

(72) Inventors: Xu Chen, Apex, NC (US); Saratendu Sethi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/162,794

(22) Filed: Oct. 17, 2018

(65) Prior Publication Data

US 2019/0050368 A1    Feb. 14, 2019

Related U.S. Application Data

(63) Continuation-in-part of application No. 16/108,293, filed on Aug. 22, 2018, and a continuation-in-part of application No. 15/686,863, filed on Aug. 25, 2017, now Pat. No. 10,127,477, and a continuation-in-part of application No. 15/335,530, filed on Oct. 27, 2016, now Pat. No. 9,792,562.

(60) Provisional application No. 62/739,323, filed on Sep. 30, 2018, provisional application No. 62/660,886, filed on Apr. 20, 2018, provisional application No. 62/660,886, filed on Apr. 20, 2018, provisional application No. 62/545,923, filed on Aug. 15, 2017, provisional application No. 62/471,335, filed on Mar.

(Continued)

(51) Int. Cl.
*G06N 5/00*      (2006.01)
*G06N 20/00*    (2019.01)
*G06F 17/16*    (2006.01)
*G06K 9/62*      (2006.01)

(52) U.S. Cl.
CPC ............. *G06N 20/00* (2019.01); *G06F 17/16* (2013.01); *G06K 9/6223* (2013.01); *G06K 9/6267* (2013.01); *G06N 5/003* (2013.01)

(58) Field of Classification Search
CPC ...................................... G06N 5/003
USPC ........................................... 706/46
See application file for complete search history.

(56) References Cited

U.S. PATENT DOCUMENTS

2019/0034766 A1    1/2019   Chen

OTHER PUBLICATIONS

Zhang et al ("Prototype Vector Machine for Large Scale Semi-Supervised Learning") (Year: 2009).*

(Continued)

*Primary Examiner* — Lut Wong
(74) *Attorney, Agent, or Firm* — Bell & Manning, LLC

(57) ABSTRACT

A computing device automatically classifies an observation vector. A label set defines permissible values for a target variable. Supervised data includes a labeled subset that has one of the permissible values. A converged classification matrix is computed based on the supervised data and an unlabeled subset using a prior class distribution matrix that includes a row for each observation vector. Each column is associated with a single permissible value of the label set. A cell value in each column is a likelihood that each associated permissible value of the label set occurs based on prior class distribution information. The value of the target variable is selected using the converged classification matrix. A weighted classification label distribution matrix is computed from the converged classification matrix. The value of the target variable for each observation vector of the plurality of observation vectors is output to a labeled dataset.

30 Claims, 8 Drawing Sheets

Related U.S. Application Data

14, 2017, provisional application No. 62/325,668, filed on Apr. 21, 2016.

(56) References Cited

OTHER PUBLICATIONS

Zhou et al ("Learning with Local and Global Consistency") (Year: 2004).*
Zhu et al ("Combining Active Learning and Semi-Supervised Learning Using Gaussian Fields and Harmonic Functions") (Year: 2003).*

* cited by examiner

US 10,354,204 B2

MACHINE LEARNING PREDICTIVE LABELING SYSTEM

CROSS-REFERENCE TO RELATED APPLICATIONS

The present application claims the benefit of 35 U.S.C. § 119(e) to U.S. Provisional Patent Application No. 62/739,323 filed on Sep. 30, 2018, the entire contents of which is hereby incorporated by reference. The present application claims the benefit of 35 U.S.C. § 119(e) to U.S. Provisional Patent Application No. 62/660,886 filed on Apr. 20, 2018, the entire contents of which is hereby incorporated by reference.

The present application is also a continuation-in-part of U.S. patent application Ser. No. 16/108,293 that was filed Aug. 22, 2018, the entire contents of which are hereby incorporated by reference. U.S. patent application Ser. No. 16/108,293 claimed the benefit of 35 U.S.C. § 119(e) to U.S. Provisional Patent Application No. 62/660,886 filed on Apr. 20, 2018, the entire contents of which are hereby incorporated by reference.

U.S. patent application Ser. No. 16/108,293 is also a continuation-in-part of U.S. patent application Ser. No. 15/686,863 that was filed Aug. 25, 2017, the entire contents of which are hereby incorporated by reference. U.S. patent application Ser. No. 15/686,863 claimed the benefit of 35 U.S.C. § 119(e) to U.S. Provisional Patent Application No. 62/545,923 filed on Aug. 15, 2017, the entire contents of which are hereby incorporated by reference. U.S. patent application Ser. No. 15/686,863 also claimed the benefit of 35 U.S.C. § 119(e) to U.S. Provisional Patent Application No. 62/471,335 filed on Mar. 14, 2017, the entire contents of which are hereby incorporated by reference. U.S. patent application Ser. No. 15/686,863 is also a continuation-in-part of U.S. patent application Ser. No. 15/335,530 that was filed Oct. 27, 2016 and issued Oct. 17, 2017, as U.S. Pat. No. 9,792,562, the entire contents of which are hereby incorporated by reference. U.S. patent application Ser. No. 15/335,530 claimed the benefit of 35 U.S.C. § 119(e) to U.S. Provisional Patent Application No. 62/325,668 filed on Apr. 21, 2016, the entire contents of which are hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label, target variable y, in training data by defining a model that describes the hidden structure in the training data. Supervised learning requires that the target (dependent) variable y be labeled in training data so that a model can be built to predict the label of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

Prior information is usually considered as an important information resource in machine learning and has been widely utilized for enhancing the prediction performance in machine learning such as Bayesian statistics, non-parametric Bayesian models, etc. For example, in medical image diagnosis, prior information about the distribution of a disease and a survival rate may help doctors make better decisions using a machine learning model. As another example, in sentiment analysis, prior polarity scores may be used to improve a classification performance. In the natural language processing, prior information plays an important role in the generative statistical model and Bayesian inference such as latent Dirichlet allocation.

SUMMARY

In an example embodiment, a non-transitory computer-readable medium is provided having stored thereon computer-readable instructions that, when executed by a computing device, cause the computing device to automatically classify an observation vector. A label set is read that defines permissible values for a target variable. Supervised data that includes a labeled subset of a plurality of observation vectors is identified. Each of the labeled subset of the plurality of observation vectors has one of the permissible values of the target variable. An unlabeled subset of the plurality of observation vectors that includes the plurality of observation vectors not included in the identified supervised data is identified. (a) A converged classification matrix is computed based on the identified supervised data and the identified unlabeled subset of the plurality of observation vectors that defines a label probability for each permissible value defined in the label set for each observation vector of the identified unlabeled subset of the plurality of observation vectors. The converged classification matrix is further computed using a prior class distribution matrix that includes a row for each observation vector of the plurality of observation vectors. Each column is associated with a single permissible value of the label set. A cell value in each column is a likelihood that each associated permissible value of the label set occurs based on prior class distribution information. (b) For each observation vector of the unlabeled subset of the plurality of observation vectors, the value of the target variable associated with a maximum label probability value identified from the computed, converged classification matrix is selected. (c) A weighted classification label distribution matrix is computed from the computed, converged classification matrix using the likelihood that each permissible value of the label set occurs based on the prior class distribution information. (d) For each observation vector of the plurality of observation vectors, a distance value is computed between each pair of the plurality of observation vectors using a distance function and the computed, weighted classification label distribution matrix. (e) Observation vectors from the identified unlabeled subset of the plurality of observation vectors are selected that have minimum values for the computed distance value. A predefined number of observation vectors is selected. (f) The supervised data is updated to include the selected observation vectors with the value of the target variable selected in (b) for the respective selected observation vector. (g) The selected observation vectors are removed from the unlabeled subset of the plurality of observation vectors. (h) (a) and (b) are repeated. The value of the target variable for each observation vector of the plurality of observation vectors is output to a labeled dataset.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to automatically classify an observation vector.

In an example embodiment, a method of automatically classifying an observation vector is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
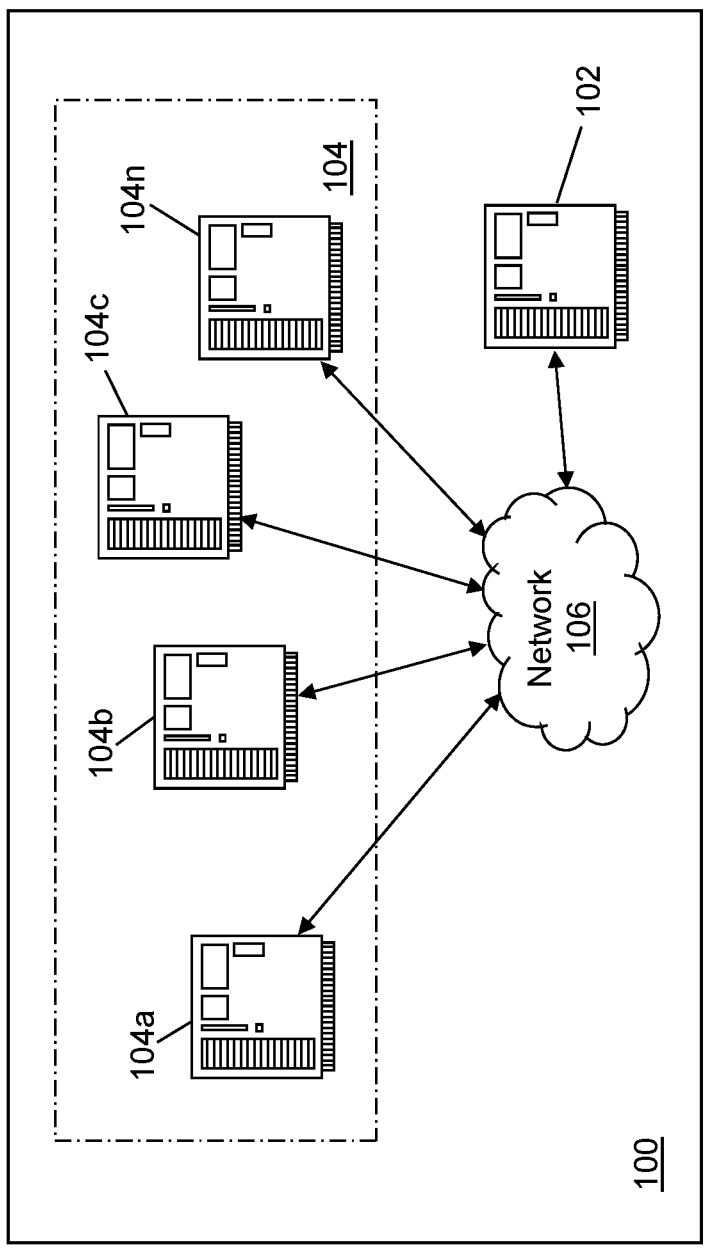
FIG. 1 depicts a block diagram of a data labeling system in accordance with an illustrative embodiment.

Referring to FIG. 1, a block diagram of a data labeling system 100 is shown in accordance with an illustrative embodiment. Data labeling system 100 may support distributed label processing through the use of a plurality of computing devices and/or the use of a plurality of threads of a multithreaded computing device. In an illustrative embodiment, data labeling system 100 may include master device 102, a plurality of node devices 104, and a network 106. Master device 102 stores and/or accesses a partially labeled dataset 224 (shown referring to FIG. 2). Master device 102 coordinates processing of partially labeled dataset 224 by one or more threads of each node device 300 (shown referring to FIG. 3) of the plurality of node devices 104 to define labeled dataset 228 (shown referring to FIG. 2). As another option, master device 102 may process partially labeled dataset 224 to define labeled dataset 228 using one or more threads of master device 102. For example, master device 102 may control execution of a plurality of threads to perform computations in parallel. When the plurality of node devices 104 includes at least one computing device distinct from master device 102, each node device 300 may control execution of one or more threads to further perform computations in parallel.

The components of data labeling system 100 may be located in a single room or adjacent rooms, in a single facility, and/or may be distributed geographically from one another. When the plurality of node devices 104 includes at least one computing device distinct from master device 102, master device 102 and each node device 300 communicate using network 106. Network 106 may include one or more networks of the same or different types. Network 106 can be any type of wired and/or wireless public or private network including a cellular network, a local area network, a wide area network such as the Internet or the World Wide Web, etc. Network 106 further may comprise sub-networks and include any number of devices.

For illustration, FIG. 1 represents each node device 300 as a server computer though each node device 300 can have any form factor of computing device. In general, a server computer may include faster processors, additional processors, more disk memory, and/or more random access memory (RAM) than a client computer and support multi-threading as understood by a person of skill in the art. The plurality of node devices 104 are represented to include a first server computer 104a, a second server computer 104b, a third server computer 104c, and a fourth server computer 104n though the plurality of node devices 104 can include any number of computing devices of the same or different computer form factors. The computing devices of the plurality of node devices 104 send and receive communications through network 106 to/from another of the one or more computing devices of the plurality of node devices 104 and/or to/from master device 102. The one or more computing devices of the plurality of node devices 104 may communicate using various transmission media that may be wired and/or wireless as understood by those skilled in the art.

In the illustrative embodiment, master device 102 is represented as a server computing device though master device 102 may include a computing device of any form factor. Master device 102 sends and receives communications through network 106 to/from each node device 300 of the plurality of node devices 104. Master device 102 may communicate using various transmission media that may be wired and/or wireless as understood by those skilled in the art.

Data labeling system 100 may be implemented as a grid of computers with each computing device of the plurality of node devices 104 storing a portion of partially labeled dataset 224 and/or of a labeled dataset 228 (shown referring to FIG. 2) as described further below. Data labeling system 100 may be implemented as a multi-node Hadoop® cluster (also referred to as a Hadoop file system (HDFS)). For example, Apache™ Hadoop® is an open-source software framework for distributed computing supported by the Apache Software Foundation. Data labeling system 100 may use cloud computing technologies, which support on-demand network access to a shared pool of configurable computing resources (e.g., networks, servers, storage, applications and services) that can be rapidly provisioned and released with minimal management effort or service provider interaction. Data labeling system 100 may use the SAS® High Performance Analytics server developed and provided by SAS Institute Inc. of Cary, N.C., USA. Data labeling system 100 may use the SAS LASR™ Analytic Server to deliver statistical modeling and machine learning capabilities in a highly interactive programming environment, which may enable multiple users to concurrently manage data, transform variables, perform exploratory analysis, and build and compare models. Data labeling system 100 may use SAS In-Memory Statistics for Hadoop® developed and provided by SAS Institute Inc. of Cary, N.C., USA to read big data once and analyze it several times by persisting the data in-memory. The SAS® Viya™ open, cloud-ready, in-memory architecture developed and provided by SAS Institute Inc. of Cary, N.C., USA also may be used as an analytic platform to enable multiple users to concurrently access data stored in partially labeled dataset 224. Data labeling system 100 may be another type and configuration or a hybrid of multiple types of systems. Of course, other distributed file systems may be used. For example, data labeling system 100 may be implemented using a TeraData® high performance database.

Figure 2:
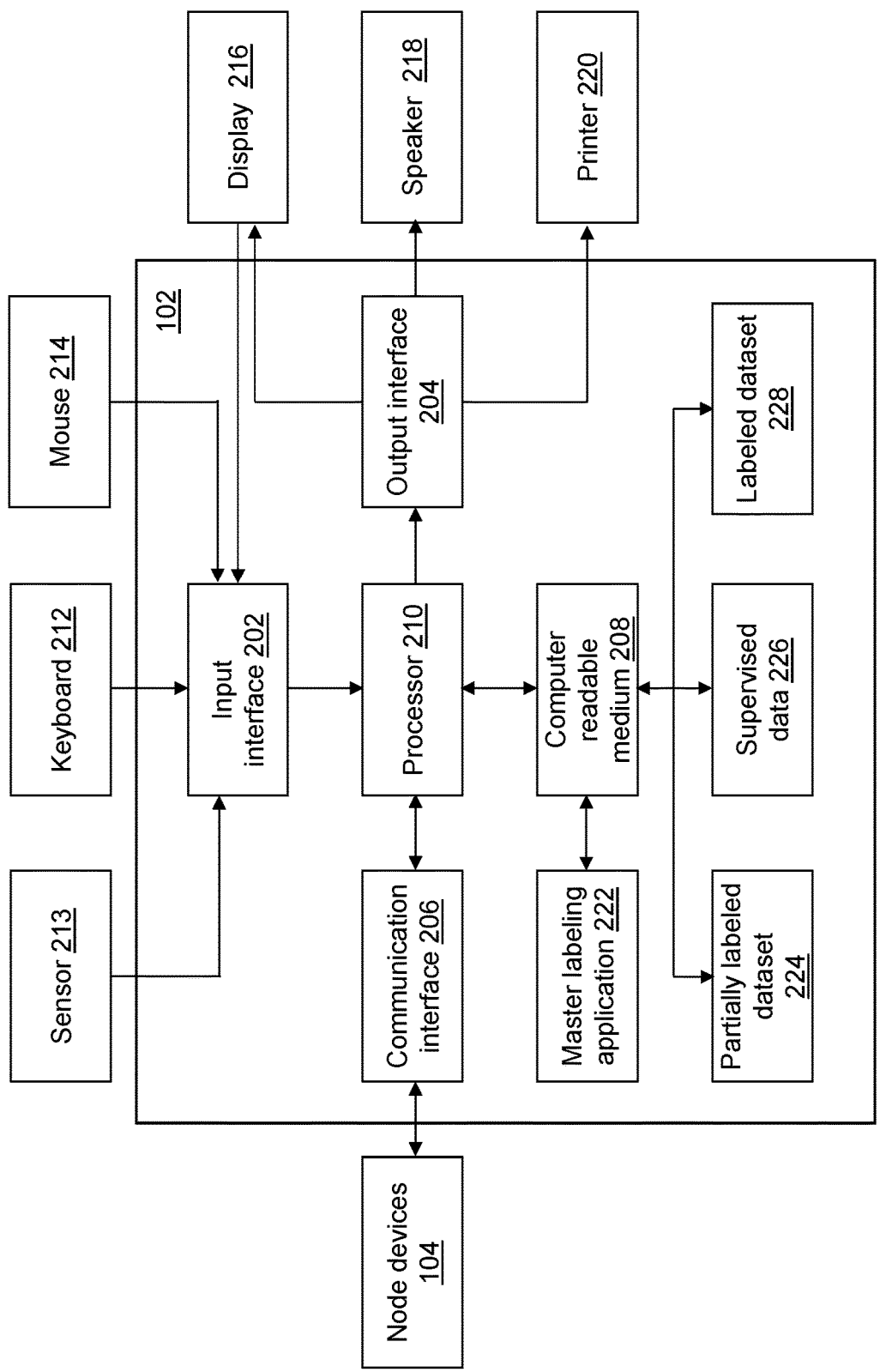
FIG. 2 depicts a block diagram of a master device of the data labeling system of FIG. 1 in accordance with an illustrative embodiment.

Referring to FIG. 2, a block diagram of master device 102 is shown in accordance with an illustrative embodiment. Master device 102 may include an input interface 202, an output interface 204, a communication interface 206, a non-transitory computer-readable medium 208, a processor 210, a master labeling application 222, partially labeled dataset 224, supervised data 226, and labeled dataset 228. Fewer, different, and/or additional components may be incorporated into master device 102. A user may directly access master device 102 through input interface 202 and output interface 204, or a user computing device may communicate with master device 102 through communication interface 206 and network 106.

Input interface 202 provides an interface for receiving information from the user or another device for entry into master device 102 as understood by those skilled in the art. Input interface 202 may interface with various input technologies including, but not limited to, a keyboard 212, a sensor 213, a mouse 214, a display 216, a track ball, a keypad, one or more buttons, etc. to allow the user to enter information into master device 102 or to make selections presented in a user interface displayed on display 216. The same interface may support both input interface 202 and output interface 204. For example, display 216 comprising a touch screen provides a mechanism for user input and for presentation of output to the user. Master device 102 may have one or more input interfaces that use the same or a different input interface technology. The input interface technology further may be accessible by master device 102 through communication interface 206.

Output interface 204 provides an interface for outputting information for review by a user of master device 102 and/or for use by another application or device. For example, output interface 204 may interface with various output technologies including, but not limited to, display 216, a speaker 218, a printer 220, etc. Master device 102 may have one or more output interfaces that use the same or a different output interface technology. The output interface technology further may be accessible by master device 102 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Master device 102 may have one or more communication interfaces that use the same or a different communication interface technology. For example, master device 102 may support communication using an Ethernet port, a Bluetooth antenna, a telephone jack, a USB port, etc. Data and messages may be transferred between master device 102 and the plurality of node devices 104 using communication interface 206.

Computer-readable medium 208 is an electronic holding place or storage for information so the information can be accessed by processor 210 as understood by those skilled in the art. Computer-readable medium 208 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Master device 102 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Master device 102 also may have one or more drives that support the loading of a memory media such as a CD, DVD, an external hard drive, etc. One or more external hard drives further may be connected to master device 102 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Master device 102 may include a plurality of processors that use the same or a different processing technology.

Master labeling application 222 performs operations associated with extracting supervised data 226 from partially labeled dataset 224, sending a copy of supervised data 226 to each node device 300 of the plurality of node devices 104, and/or defining labeled dataset 228 from data stored in partially labeled dataset 224. Some or all of the operations described herein may be embodied in master labeling application 222.

Referring to the example embodiment of FIG. 2, master labeling application 222 is implemented in software (comprised of computer-readable and/or computer-executable instructions) stored in computer-readable medium 208 and accessible by processor 210 for execution of the instructions that embody the operations of master labeling application 222. Master labeling application 222 may be written using one or more programming languages, assembly languages, scripting languages, etc. Master labeling application 222 may be integrated with other analytic tools. For example, master labeling application 222 may be integrated as part of SAS® Enterprise Miner™ developed and provided by SAS Institute Inc. of Cary, N.C., USA that may be used to create highly accurate predictive and descriptive models based on analysis of vast amounts of data from across an enterprise. Master labeling application 222 further may be integrated as part of SAS® Enterprise Guide, SAS® Visual Analytics, SAS® LASR™ Analytic Server, SAS® High Performance Analytics server, SAS® Viya™, SAS In-Memory Statistics for Hadoop®, SAS® Access Engine(s), etc. also developed and provided by SAS Institute Inc. of Cary, N.C., USA.

Master labeling application 222 is applicable in a variety of industries. For example, master labeling application 222 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Master labeling application 222 may be integrated with other data processing tools to automatically process data generated as part of operation of an enterprise, facility, system, device, etc., to label the data, and to provide a warning or alert associated with the labeling using input interface 202, output interface 204, and/or communication interface 206 so that appropriate action can be initiated in response to the labeling. For example, medical images that include a tumor may be recognized by master labeling application 222 that triggers the sending of a notification message to a clinician that a tumor has been identified based on a "tumor" label determined for the image data.

Master labeling application 222 may be implemented as a Web application. For example, master labeling application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Partially labeled dataset 224 may include, for example, a plurality of rows and a plurality of columns. The plurality of rows may be referred to as observation vectors or records, and the columns may be referred to as variables. Partially labeled dataset 224 may be transposed. An observation vector $x_i$ may include a value for each of the plurality of variables associated with the observation i. Each variable of the plurality of variables describes a characteristic of a physical object, such as a living thing, a vehicle, terrain, a computing device, a physical environment, etc. For example, if partially labeled dataset 224 includes data related to operation of a vehicle, the variables may include an oil pressure, a speed, a gear indicator, a gas tank level, a tire pressure for each tire, an engine temperature, a radiator level, etc. Partially labeled dataset 224 may include data captured as a function of time for one or more physical objects.

Partially labeled dataset 224 includes human labeled (supervised) data and unlabeled data. The supervised data includes a $y_i$-variable (target) value that indicates a truth value related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Sensor 213 may measure a physical quantity in an environment to which sensor 213 is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, sensor 213 may be medical imaging equipment (i.e., computed tomography image, magnetic resonance image, x-ray image, ultrasound image, etc.), and partially labeled dataset 224 may include image data captured by sensor 213 of a body part of a living thing. A subset of the image data is labeled, for example, as either indicating existence of a medical condition or non-existence of the medical condition. Partially labeled dataset 224 may include a reference to image data that may be stored, for example, in an image file, and the existence/non-existence label associated with each image file. Partially labeled dataset 224 includes a plurality of such references. The existence/non-existence labels may be defined by a clinician or expert in the field to which data stored in partially labeled dataset 224 relates.

The data stored in partially labeled dataset 224 may be generated by and/or captured from a variety of sources including one or more sensors of the same or different type, one or more computing devices, etc. The data stored in partially labeled dataset 224 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Partially labeled dataset 224 may be stored on computer-readable medium 208 or on one or more computer-readable media of the plurality of node devices 104 and accessed by master device 102 using communication interface 206, input interface 202, and/or output interface 204. Data stored in partially labeled dataset 224 may be sensor measurements or signal values captured by sensor 213, may be generated or captured in response to occurrence of an event or a transaction, generated by a device such as in response to an interaction by a user with the device, etc. The data stored in partially labeled dataset 224 may be captured at different date/time points periodically, intermittently, when an event occurs, etc. Each record of partially labeled dataset 224 may include one or more date values and/or time values.

Partially labeled dataset 224 may include data captured at a high data rate such as 200 or more observations per second for one or more physical objects. For example, data stored in partially labeled dataset 224 may be generated as part of the Internet of Things (IoT), where things (e.g., machines, devices, phones, sensors) can be connected to networks and the data from these things collected and processed within the things and/or external to the things before being stored in partially labeled dataset 224. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in partially labeled dataset 224.

Partially labeled dataset 224 may be stored using one or more of various structures as known to those skilled in the art including one or more files of a file system, a relational database, one or more tables of a system of tables, a structured query language database, etc. on master device 102 and/or on the plurality of node devices 104. Master device 102 may coordinate access to partially labeled dataset 224 that is distributed across the plurality of node devices 104 that may include one or more computing devices that can communicate using a network. For example, partially labeled dataset 224 may be stored in a cube distributed across a grid of computers as understood by a person of skill in the art. As another example, partially labeled dataset 224 may be stored in a multi-node Hadoop® cluster. As another example, partially labeled dataset 224 may be stored in a cloud of computers and accessed using cloud computing technologies, as understood by a person of skill in the art. The SAS® LASR™ Analytic Server may be used as an analytic platform to enable multiple users to concurrently access data stored in partially labeled dataset 224. SAS® Viya™ may be used as an analytic platform to enable multiple users to concurrently access data stored in partially labeled dataset 224. Some systems may use SAS In-Memory Statistics for Hadoop® to read big data once and analyze it several times by persisting it in-memory for the entire session. Some systems may be of other types and configurations.

Supervised data 226 includes data from partially labeled dataset 224 for which the $y_i$-variable (target) value of each observation vector $x_i$ is labeled by a human or selected automatically using data labeling system 100 and determined to have high likelihood of being correct as discussed further below. For example, in the medical imaging example, the label that is defined for and associated with each image file has been defined after review of the image file and a determination of the label by the human. One or more humans may label supervised data 226 at various points in time.

Labeled dataset 228 may be identical to partially labeled dataset 224 except that labeled dataset 228 includes only data such that the $y_i$-variable (target) value of each observation vector $x_i$ is labeled. For example, in the medical imaging example, the existence or non-existence label is defined for and associated with each image file though a subset of the image files are not labeled by a human, but by master labeling application 222.

Figure 3:
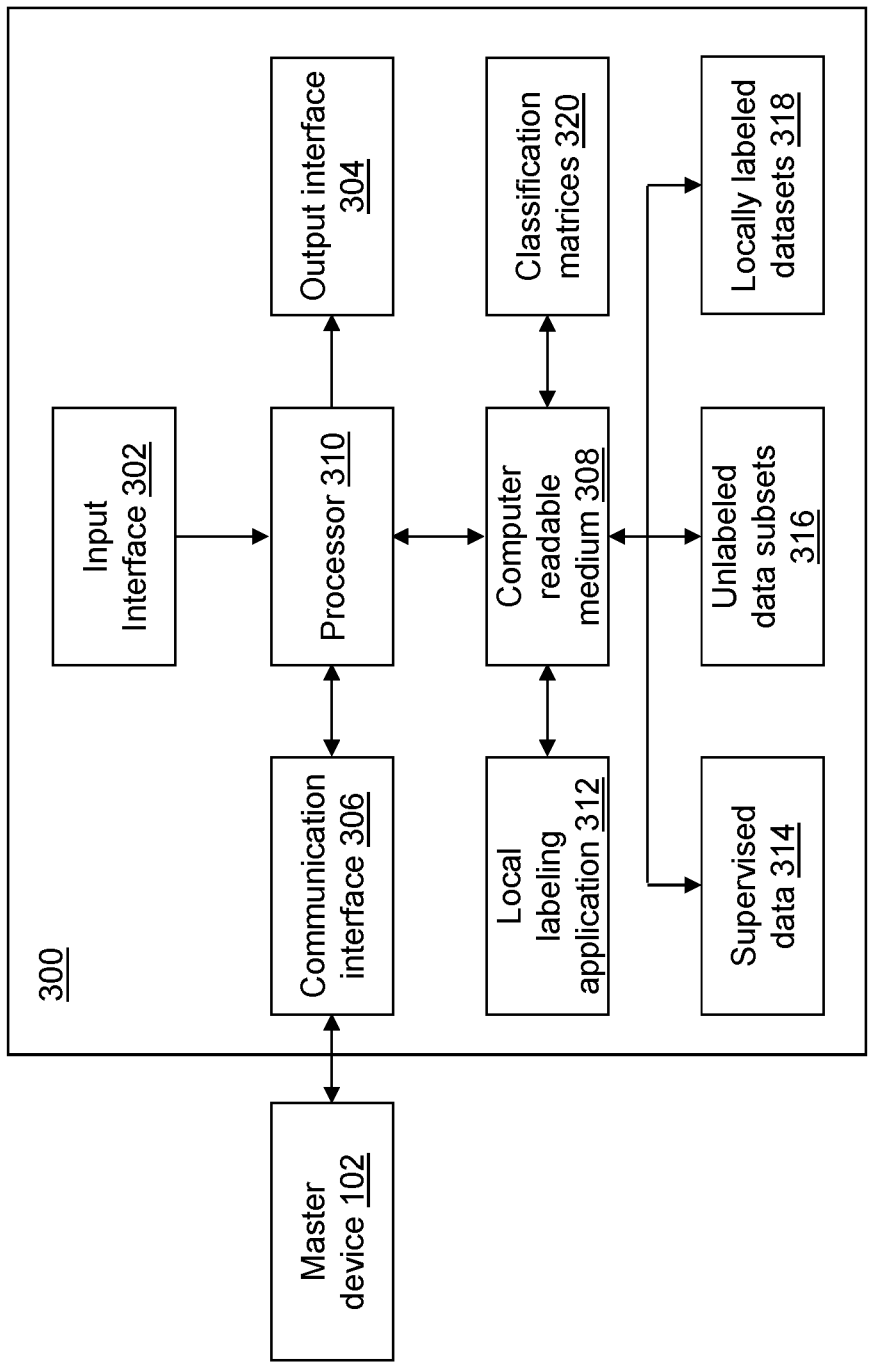
FIG. 3 depicts a block diagram of a distributed node device of the data labeling system of FIG. 1 in accordance with an illustrative embodiment.

Referring to FIG. 3, a block diagram of node device 300 is shown in accordance with an illustrative embodiment. Node device 300 is an example computing device of first server computer 104a, second server computer 104b, third server computer 104c, and fourth server computer 104n. Node device 300 may include a second input interface 302, a second output interface 304, a second communication interface 306, a second non-transitory computer-readable medium 308, a second processor 310, a local labeling application 312, supervised data 314, one or more unlabeled data subsets 316, one or more locally labeled datasets 318, and one or more classification matrices 320. Supervised data 314 is a copy of supervised data 226. Fewer, different, and additional components may be incorporated into node device 300.

Each unlabeled data subset of the one or more unlabeled data subsets 316 stores a portion (subset) of the partially labeled dataset 224 for which the $y_i$-variable (target) value of each observation vector $x_i$ is not labeled. Each node device 300 of the plurality of node devices may store a different portion or portions, if executing multiple threads, of the unlabeled data (subset) as determined by master device 102. In other embodiments, the portions may include overlapping observation vectors that are included in a plurality of unlabeled data subsets 316 distributed across the threads of node device 300 or across the threads of another node device 300 of the plurality of node devices 104.

Each locally labeled dataset of the one or more locally labeled datasets 318 and each classification matrix of the one or more classification matrices 320 is associated with a distinct unlabeled data subset of the one or more unlabeled data subsets 316. A number of the one or more unlabeled data subsets 316, of the one or more locally labeled datasets 318, and of the one or more classification matrices 320 may be associated with a number of threads selected to execute local labeling application 312 on node device 300. Each locally labeled dataset of the one or more locally labeled datasets 318 and each classification matrix of the one or more classification matrices 320 is created by execution of local labeling application 312 with supervised data 314 and an associated unlabeled data subset of the one or more unlabeled data subsets 316. When data labeling system 100 only includes master device 102 without any node device 300, master device 102 similarly may include an unlabeled data subset and a classification matrix for each thread selected to execute local labeling application 212 on master device 102. Each thread on master device 102 may write to a locally labeled dataset or directly to labeled dataset 228.

Second input interface 302 provides the same or similar functionality as that described with reference to input interface 202 of master device 102 though referring to node device 300. Second output interface 304 provides the same or similar functionality as that described with reference to output interface 204 of master device 102 though referring to node device 300. Second communication interface 306 provides the same or similar functionality as that described with reference to communication interface 206 of master device 102 though referring to node device 300. Data and messages may be transferred between node device 300 and master device 102 using second communication interface 306. Each node device 300 may further communicate with another node device 300 using second communication interface 306. Second computer-readable medium 308 provides the same or similar functionality as that described with reference to computer-readable medium 208 of master device 102 though referring to node device 300. Second processor 310 provides the same or similar functionality as that described with reference to processor 210 of master device 102 though referring to node device 300.

Local labeling application 312 performs operations associated with creating each locally labeled dataset of the one or more locally labeled datasets 318 and each classification matrix of the one or more classification matrices 320 from supervised data 314 and each associated unlabeled data subset of the one or more unlabeled data subsets 316. Some or all of the operations described herein may be embodied in local labeling application 312. The operations may be implemented using hardware, firmware, software, or any combination of these methods. Referring to the example embodiment of FIG. 3, local labeling application 312 is implemented in software (comprised of computer-readable and/or computer-executable instructions) stored in second computer-readable medium 308 and accessible by second processor 310 for execution of the instructions that embody the operations of local labeling application 312. Local labeling application 312 may be written using one or more programming languages, assembly languages, scripting languages, etc. Local labeling application 312 may be implemented as a Web application. Master labeling application 222 and local labeling application 312 may be parts of the same application, may be separate applications, or may be integrated applications that are designed to interact with each other, for example, through an application programming interface.

Figure 4A:
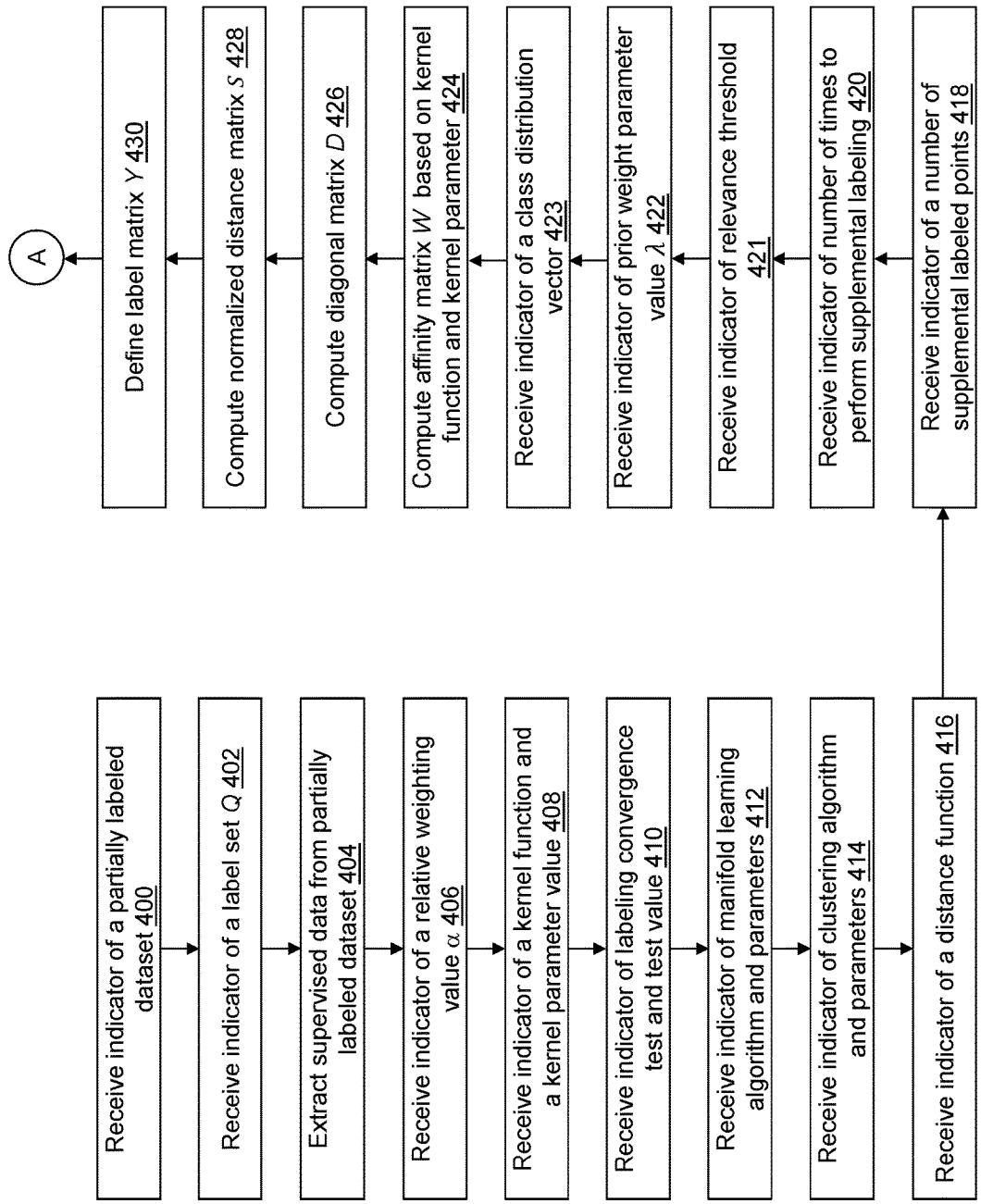
FIGS. 4A and 4B depict a flow diagram illustrating examples of operations performed by the master device of FIG. 2 without a distributed node device in accordance with a first illustrative embodiment.
Figure 4B:
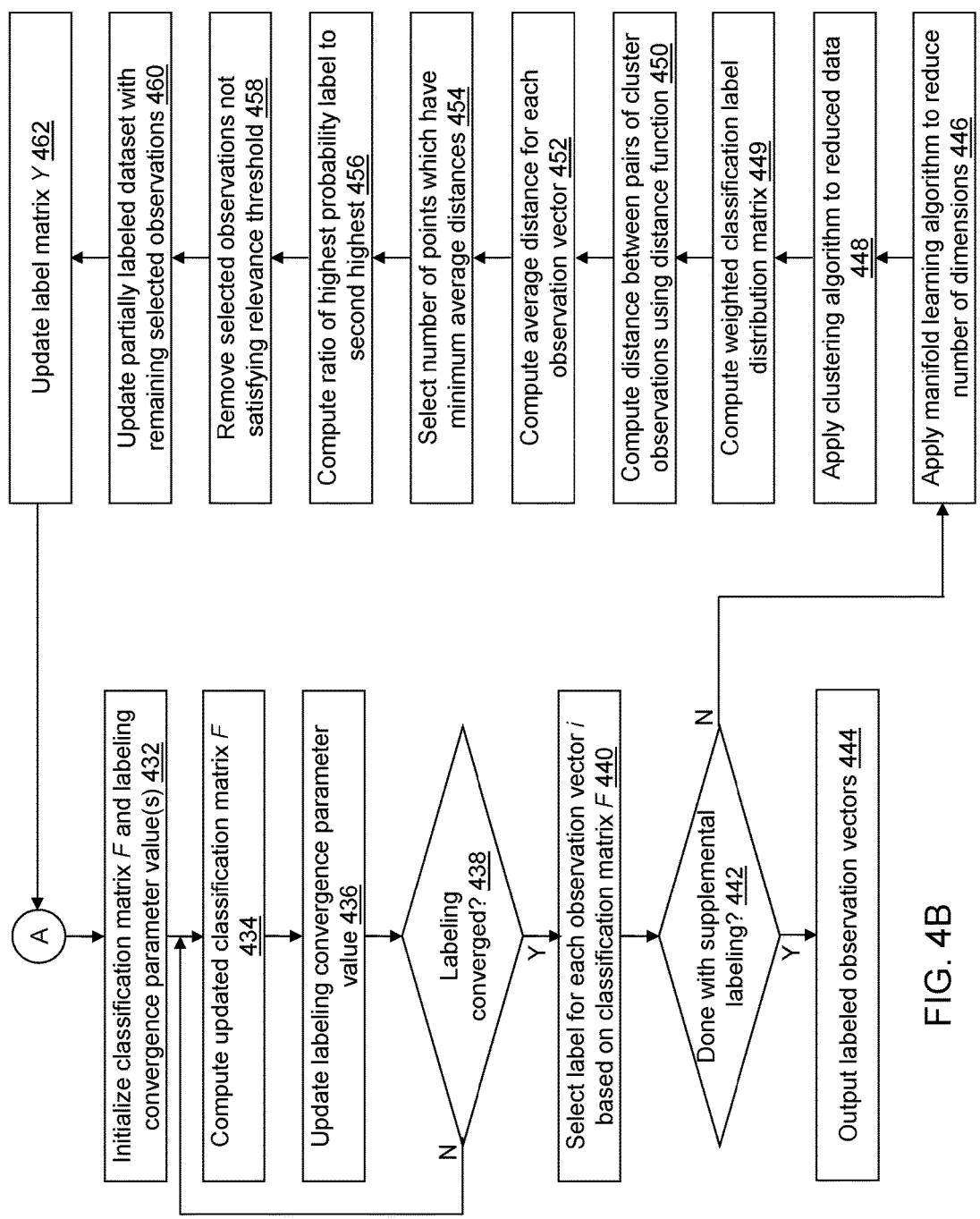

Referring to FIGS. 4A and 4B, example operations associated with master labeling application 222 are described. For example, master labeling application 222 may be used to create labeled dataset 228 from partially labeled dataset 224. Additional, fewer, or different operations may be performed depending on the embodiment of master labeling application 222. The order of presentation of the operations of FIGS. 4A and 4B is not intended to be limiting. Although some of the operational flows are presented in sequence, the various operations may be performed in various repetitions, concurrently (in parallel, for example, using threads), and/or in other orders than those that are illustrated. For example, a user may execute master labeling application 222, which causes presentation of a first user interface window, which may include a plurality of menus and selectors such as drop-down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries entered into a data field of the user interface, one or more data items read from computer-readable medium 208 or otherwise defined with one or more default values, etc. that are received as an input by master labeling application 222.

In an operation 400, a first indicator may be received that indicates partially labeled dataset 224. For example, the first indicator indicates a location and a name of partially labeled dataset 224. As an example, the first indicator may be received by master labeling application 222 after selection from a user interface window or after entry by a user into a user interface window. In an alternative embodiment, partially labeled dataset 224 may not be selectable. For example, a most recently created dataset may be used automatically. A subset of the observation vectors $x_i$ included in partially labeled dataset 224 are labeled. Merely for illustration, a relatively small percent, such as less than 10%, of the observation vectors $x_i$ included in partially labeled dataset 224 are labeled. Partially labeled dataset 224 includes a plurality of observation vectors $x_i$ where i=1, ..., n.

In an operation 402, a second indicator may be received that indicates a label set Q associated with partially labeled dataset 224. For example, the label set Q includes a list of permissible values that the $y_i$-variable (target) value of each observation vector $x_i$ may have. For illustration, if partially labeled dataset 224 includes text images of numeric digits, the label set Q includes c=10 permissible values that may be indicated as Q={1, ..., c}, where Q=1 may be associated with the digit "0", Q=2 may be associated with the digit "1", Q=3 may be associated with the digit "2", ..., Q=10 may be associated with the digit "9". No $y_i$-variable (target) value or a variable value of zero may indicate that the associated observation vector $x_i$ is not labeled in partially labeled dataset 224.

In an operation 404, supervised data 226 is extracted from partially labeled dataset 224. For example, a $y_i$-variable (target) value of zero or that is missing may indicate that the associated observation vector $x_i$ is not labeled in partially labeled dataset 224 when the value of zero is not included in the label set Q. Thus, partially labeled dataset 224 defines a point set $\chi=\{x_1, \ldots, x_l, x_{l+1}, \ldots, x_n\}$, where n indicates a number of data points or observation vectors $x_i$ included in partially labeled dataset 224, where the observation vectors $x_i$ (i≤l) are labeled such that $y_i \in Q$, and the remaining observation vectors $x_i$ (l<i≤n) are unlabeled such that $y_i \notin Q$. Thus, l indicates a number of labeled data points or observation vectors $x_i$ included in partially labeled dataset 224. The labeled data points, which have been labeled by a human, are referenced herein as supervised data or supervised data points or supervised observation vectors. For illustration, l may be a small percentage, such as less than 1% of the observation vectors $x_i$ included in partially labeled dataset 224. Master labeling application 222, possibly working with the plurality of node devices 104, determines a label from label set Q for each observation vector $x_i$ included in partially labeled dataset 224 that is unlabeled. The resulting fully labeled data is stored in labeled dataset 228, where some of the labels were determined by master labeling application 222 and some of the labels were determined by the human. Supervised data 226 includes the observation vectors $x_i$ (i≤l) that are labeled such that $y_i \in Q$. When a single thread is used by master device 102, supervised data 226 may not be extracted from partially labeled dataset 224 because supervised data 226 is extracted from partially labeled dataset 224 to provide to each thread.

In an operation 406, a third indicator may be received that indicates a relative weighting value α, where α is selected between zero and one, non-inclusive. As described further below, each data point receives information from its neighboring data points while also retaining its initial label information. The relative weighting value α specifies a relative amount of information from neighbors versus the initial label information. The relative weighting value α=0.5 indicates equal weight between the information from neighbors relative to the initial label information for each observation vector.

In an operation 408, a fourth indicator of a kernel function to apply and/or a kernel parameter value to use with the kernel function may be received. For example, the fourth indicator indicates a name of a kernel function. The fourth indicator may be received by master labeling application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in master labeling application 222. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter. For example, a value for s, the Gaussian bandwidth parameter, may be received with the indication of the Gaussian kernel function. Alternatively, a default value for the kernel parameter value may be stored, for example, in computer-readable medium 208 and used automatically or the kernel parameter value may not be used. In another alternative embodiment, the value of the kernel parameter may not be selectable. Instead, a fixed, predefined value may be used.

In an operation 410, a fifth indicator of a labeling convergence test and/or a labeling convergence test value may be received. For example, the fifth indicator indicates a name of a labeling convergence test. The fifth indicator may be received by master labeling application 222 after selection from a user interface window or after entry by a user into a user interface window. A default value for the labeling convergence test may further be stored, for example, in computer-readable medium 208. As an example, a labeling convergence test may be selected from "Num Iterations", "Within Tolerance", etc. For example, a default convergence test may be "Num Iterations". Of course, the labeling convergence test may be labeled or selected in a variety of different manners by the user as understood by a person of skill in the art. In an alternative embodiment, the labeling convergence test may not be selectable, and a single labeling convergence test is implemented by master labeling application 222. For example, the labeling convergence test "Num Iterations" may be used by default or without allowing a selection.

As an example, when the labeling convergence test "Num Iterations" is indicated, the labeling convergence test value is a number of iterations $M_L$. Merely for illustration, the number of iterations $M_L$ may be defined between 10 and 1000 though the user may determine that other values are more suitable for their application as understood by a person of skill in the art, for example, based on the labeling accuracy desired, computing resources available, size of partially labeled dataset 224, etc. As another example, when the labeling convergence test "Within Tolerance" is indicated, the labeling convergence test value may be a tolerance value τ. A default value for the labeling convergence test value may be stored, for example, in computer-readable medium 208 and used automatically when the fifth indicator is not received. In an alternative embodiment, the labeling convergence test value may not be selectable. Instead, a fixed, predefined value may be used.

In an operation 412, a sixth indicator of a manifold learning algorithm and/or a manifold learning algorithm parameter value may be received. The manifold learning algorithm is a dimensionality reduction algorithm. For example, the sixth indicator indicates a name of a manifold learning algorithm. The sixth indicator may be received by master labeling application 222 after selection from a user interface window or after entry by a user into a user interface window. A default value for the manifold learning algorithm may further be stored, for example, in computer-readable medium 208. As an example, a manifold learning algorithm may be selected from "TSNE", "PCA", "LDA", etc. TSNE may refer to a t-distributed stochastic neighbor embedding algorithm. For example, the paper by L. van der Maaten and G. Hinton., "Visualizing data using t-SNE", Journal of Machine Learning Research, pp. 2579-2605 (2008) describes an illustrative TSNE algorithm. PCA may refer to a principal component analysis algorithm. For example, the paper by M. Andrzej and R. Waldeman, "Principal components analysis (PCA)", Computers and Geoscience, vol 19, iss. 3, pp. 303-342 (1993) describes an illustrative PCA algorithm. LDA may refer to a linear discriminant analysis algorithm. For example, the paper by P. Xanthopoulos, P. M. Pardalos and T. B. Trafalis, "Linear Discriminant Analysis", Robust Data Mining, pp. 27-33 (2012) describes an illustrative LDA algorithm.

For example, a default manifold learning algorithm may be "TSNE". Of course, the manifold learning algorithm may be labeled or selected in a variety of different manners by the user as understood by a person of skill in the art. In an alternative embodiment, the manifold learning algorithm may not be selectable, and a single manifold learning algorithm is implemented by master labeling application 222. For example, the manifold learning algorithm "TSNE" may be used by default or without allowing a selection. Zero or more manifold learning algorithm parameter value(s) may be provided with the indicator of the manifold learning algorithm based on the algorithm selected.

In an operation 414, a seventh indicator of a clustering algorithm and/or a clustering algorithm parameter value may be received. The clustering algorithm classifies each observation vector into a specific cluster or group. For example, the seventh indicator indicates a name of a clustering algorithm. The seventh indicator may be received by master labeling application 222 after selection from a user interface window or after entry by a user into a user interface window. A default value for the clustering algorithm may further be stored, for example, in computer-readable medium 208. As an example, a clustering algorithm may be selected from "K-means", "K-medians", "Mean shift", etc. For example, the paper by MacQueen, J. B., *Some Methods for classification and Analysis of Multivariate Observations*, Proceedings of 5th Berkeley Symposium on Mathematical Statistics and Probability, 1, University of California Press, pp. 281-297 (1967) describes illustrative clustering algorithms. As another example, the paper by P. S. Bradley, O. L. Mangasarian, and W. N. Street, *Clustering via Concave Minimization*, in Advances in Neural Information Processing Systems, vol. 9, pp. 368-374 (1997) describes illustrative clustering algorithms. As still another example, the paper by Yizong Cheng, *Mean Shift, Mode Seeking, and Clustering*, IEEE Transactions on Pattern Analysis and Machine Intelligence, vol. 17, iss. 8, pp. 790-799 (August 1995) describes illustrative clustering algorithms.

For example, a default clustering algorithm may be "K-means". Of course, the clustering algorithm may be labeled or selected in a variety of different manners by the user as understood by a person of skill in the art. In an alternative embodiment, the clustering algorithm may not be selectable, and a single clustering algorithm is implemented by master labeling application 222. For example, the clustering algorithm "K-means" may be used by default or without allowing a selection. Zero or more clustering algorithm parameter value(s) may be provided with the indicator of the clustering algorithm based on the algorithm selected.

In an operation 416, an eighth indicator of a distance function may be received. For example, the eighth indicator indicates a name of a distance function. The eighth indicator may be received by master labeling application 222 after selection from a user interface window or after entry by a user into a user interface window. A default value for the distance function may further be stored, for example, in computer-readable medium 208. As an example, a distance function may be selected from "Symmetric Kullback-Leibler", "Euclidian", "Manhattan", "Minkowski", "Cosine", "Chebyshev", "Hamming", "Mahalanobis", etc. For example, the paper by P. E. Black, *Manhattan Distance*, in Dictionary of Algorithms and Data Structures, (2006) describes an illustrative Manhattan algorithm. For example, the paper by Hamming, R. W, *Error detecting and error correcting codes*, The Bell System Technical Journal, vol. 29, iss. 2, pp. 147-160 (1950) describes an illustrative Hamming algorithm.

As an example, a default distance function may be "Symmetric Kullback-Leibler". Of course, the distance function may be labeled or selected in a variety of different manners by the user as understood by a person of skill in the art. In an alternative embodiment, the distance function may not be selectable, and a single distance function such as the Symmetric Kullback-Leibler distance function is implemented by master labeling application 222.

In an operation 418, a ninth indicator of a number of supplemental labeled points $N_{SL}$ may be received. In an alternative embodiment, the ninth indicator may not be received. For example, a default value may be stored, for example, in computer-readable medium 208 and used automatically. In another alternative embodiment, the value of the number of supplemental labeled points $N_{SL}$ may not be selectable. Instead, a fixed, predefined value may be used. The number of supplemental labeled points $N_{SL}$ defines a number of additional data points of partially labeled dataset 224 that are identified for labeling on each iteration as described further below. Merely for illustration, the number of supplemental labeled points $N_{SL}$ may be between 2 and 10 though the user may determine that other values are more suitable for their application.

In an operation 420, a tenth indicator of a number of times $M_{SL}$ to perform supplemental labeling may be received. In an alternative embodiment, the tenth indicator may not be received. For example, a default value may be stored, for example, in computer-readable medium 208 and used automatically when the tenth indicator is not received. In an alternative embodiment, the number of times may not be selectable. Instead, a fixed, predefined value may be used. Merely for illustration, the number of times $M_{SL}$ may be set between 3 and 1000 though the user may determine that other values are more suitable for their application as understood by a person of skill in the art, for example, based on computing resources available, size of partially labeled dataset 224, etc.

In an operation 421, an eleventh indicator of a relevance threshold $\Delta$ to perform supplemental labeling may be received. In an alternative embodiment, the eleventh indicator may not be received. For example, a default value may be stored, for example, in computer-readable medium 208 and used automatically when the eleventh indicator is not received. In an alternative embodiment, the relevance threshold $\Delta$ may not be selectable. Instead, a fixed, predefined value may be used. Merely for illustration, the relevance threshold $\Delta$ may be set between $10^2$ and $10^9$ though the user may determine that other values are more suitable for their application as understood by a person of skill in the art.

In an operation 422, a twelfth indicator of a prior weight parameter value $\lambda$ may be received. In an alternative embodiment, the twelfth indicator may not be received. For example, a default value may be stored, for example, in computer-readable medium 208 and used automatically when the twelfth indicator is not received. In an alternative embodiment, the prior weight parameter value $\lambda$ may not be selectable. Instead, a fixed, predefined value may be used. Merely for illustration, the prior weight parameter value $\lambda$ may be set between zero and one to indicate how much weight is applied to a prior class distribution when updating the labeling.

In an operation 423, a thirteenth indicator of a prior class distribution vector p may be received. Prior class distribution vector p defines a likelihood of each permissible value of the label set Q based on prior information and may be indicated as $p(j)=\{p_1, \ldots, p_j\}$, $j=1 \ldots, c$, where $p_j$ is a likelihood of the jth permissible value of the label set Q. A likelihood value need not be defined for each permissible value of the label set Q when the likelihood value is only known for a subset of the permissible values of the label set Q. If not known, the associated permissible value may be left blank or set to a value of zero. In an alternative embodiment, the thirteenth indicator may not be received. For example, a default value may be stored, for example, in computer-readable medium 208 and used automatically when the thirteenth indicator is not received. In an alternative embodiment, the prior class distribution vector p may not be selectable. For illustration, a default or automatically selected prior class distribution vector p may be a uniform distribution that makes a likelihood of each permissible value of the label set Q equal to 1/c. A prior class distribution matrix U includes each $P_j$ as a jth column entry for $j=1 \ldots, c$ where each row is an observation vector $i=1, \ldots, n$ to define a n×c matrix with.

In an operation 424, an affinity matrix W is computed based on the kernel function and the kernel parameter value indicated by operation 408. For example, using the Gaussian kernel function, the affinity matrix W is defined as $$W_{ij} = \exp\frac{-\|x_i - x_j\|^2}{2s^2} \text{ if } i \neq j \text{ and } W_{ii} = 0 \text{ for } i = j,$$

where s is the kernel parameter value, $x_i$ and $x_j$ are observation vectors selected from partially labeled dataset 224, the affinity matrix W is an n×n matrix such that $i=1, \ldots, n$ and $j=1, \ldots, n$.

In an operation 426, a diagonal matrix D is computed based on the affinity matrix W. For example, using the Gaussian kernel function, the diagonal matrix D is an n×n matrix and is defined as $D_{ii}=\Sigma_{j=1}^{n} W_{ij}$ and $D_{ij}=0$ if $i \neq j$.

In an operation 428, a normalized distance matrix S is computed based on the affinity matrix W and the diagonal matrix D. For example, the normalized distance matrix S is an n×n matrix and is defined as $S=D^{-1/2}WD^{-1/2}$.

In an operation 430, a label matrix Y is defined based on partially labeled dataset 224. Label matrix Y is an n×c matrix with $Y_{ik}=1$ if $x_i$ is labeled as $y_i=k$. Otherwise, $Y_{ik}=0$, where $k=1, \ldots, c$.

Referring to FIG. 4B, in an operation 432, a classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test indicated from operation 410. As an example, when the labeling convergence test "Num Iterations" is indicated from operation 410, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$. As another example, when the labeling convergence test "Within Tolerance" is indicated from operation 410, a first labeling convergence parameter value ΔF may be initialized to a large number and associated with the tolerance value τ. Either or both convergence tests may be applied. Other convergence tests may further be applied.

In an operation 434, an updated classification matrix F(t+1) is computed using F(t+1)=αSF(t)+λU+(1−α)Y, where for a first iteration of operation 434, F(t)=F(0). The updated classification matrix F defines a label probability for each permissible value defined in label set Q for each observation vector $x_i$ with a weighted contribution from the prior class distribution matrix U.

in an operation 436, the one or more labeling convergence parameter values are updated. As an example, when the labeling convergence test "Num Iterations" is indicated from operation 410, t=t+1. As another example, when the labeling convergence test "Within Tolerance" is indicated from operation 410, ΔF=F(t+1)−F(t).

In an operation 438, a determination is made concerning whether or not labeling has converged by evaluating the labeling convergence test. When labeling has converged, processing continues in an operation 440. When labeling has not converged, processing continues in operation 434 to compute a next update of classification matrix F(t+1). As an example, when the labeling convergence test "Num Iterations" is indicated from operation 410, the first labeling convergence parameter value t is compared to the labeling convergence test value that is the number of iterations $M_L$. When t≥$M_L$, labeling has converged. As another example, when the labeling convergence test "Within Tolerance" is indicated from operation 410, the first labeling convergence parameter value ΔF is compared to the labeling convergence test value that is the tolerance value τ. When ΔF≤τ, labeling has converged.

In operation 440, the $y_i$-variable (target) value of each observation vector $x_i$ not included in supervised data 226 is labeled using F(t). $y_i$ is selected for each observation vector $x_i$ based on $$y_i = \operatorname*{argmax}_{j \le c} F_{ij}(t).$$

As a result, a label with a highest classification value as indicated by $$\operatorname*{argmax}_{j \le c} F_{ij}(t)$$

is selected as the $y_i$-variable (target) value or label for the observation vector $x_j$.

In an operation 442, a determination is made concerning whether or not supplemental labeling is done. When supplemental labeling is done, processing continues in an operation 444. When supplemental labeling is not done, processing continues in an operation 446. For example, supplemental labeling is done when a number of times operations 432-464 have been performed is greater than or equal to $M_{SL}$.

In operation 444, the $y_i$-variable (target) value of each observation vector $x_i$ including supervised data 226 is output. For example, each observation vector $x_i$ with its selected $y_i$-variable (target) value is stored in labeled dataset 228. Labeled dataset 228 may be stored on master device 102 and/or on one or more computing devices of the plurality of node devices 104 in a variety of formats as understood by a person of skill in the art. All or a subset of labeled dataset 228 further may be output to display 216, to printer 220, etc. For example, medical images labeled as including a tumor may be recognized by master labeling application 222 and presented on display 216 or indicators of the medical images may be printed on printer 220. As another option, a notification message may be sent to a clinician indicating that a tumor has been identified based on a "tumor" label determined for the image data. In an illustrative embodiment, an alert message may be sent to another device using communication interface 206, printed on printer 220 or another printer, presented visually on display 216 or another display, presented audibly using speaker 218 or another speaker, etc. based on how urgent a response is needed to a certain label. For example, if a sound signal or image data indicate an intrusion into a surveilled area, a notification message may be sent to a responder.

In operation 446, the manifold learning algorithm indicated by operation 412, if any, is applied to classification label distributions defined by F(t) for each class using the manifold learning algorithm parameter value, if any. Application of the manifold learning algorithm reduces a dimension of F(t) so that F(t) is defined by fewer classes than c.

In an operation 448, the clustering algorithm indicated by operation 414, if any, is applied using the clustering algorithm parameter value, if any, to the reduced dimension classification label distributions defined by F(t) or to the classification label distributions defined by F(t) when the manifold learning algorithm is not applied in operation 446. Application of the clustering algorithm assigns the classification label distribution of each observation vector to a cluster.

In an operation 449, a weighted classification label distribution matrix P is computed using P(i, j)=$\sum_{j=1}^{c'}[(1-\lambda)F_{ij}(t)+\lambda p(j)]$, i=1, . . . , n if the manifold learning algorithm is not applied in operation 446 where c' is the reduced number of classes when the manifold learning algorithm is applied in operation 446 or c'=c when the manifold learning algorithm is not applied in operation 446.

In an operation 450, a distance matrix Dis is computed between the weighted classification label distribution of each observation vector and the other observation vector(s) assigned to the same cluster. For illustration, when the distance function indicated from operation 214 is "Symmetric Kullback-Leibler", $$Dis_{mkd} = \sum_{j=1}^{c'} P_{kj} \log \frac{P_{kj}}{P_{mj}} + \sum_{j=1}^{c'} P_{mj} \log \frac{P_{mj}}{P_{kj}}$$

where m=1, ..., N(d), k=1, ..., N(d), and d=1, ..., D, where D is a number of clusters defined in operation 448, and N(d) is a number of observation vectors in cluster D, where an index to the observation vectors assigned to each cluster has been defined as 1, ..., N(d) for each cluster.

In an operation 452, an average distance matrix between each observation vector and the other observations vectors assigned to the same cluster is computed using $$AD_m = \sum_{d=1}^{D} \frac{1}{2N(d)} \sum_{k=1}^{N(d)} Dis_{mkd},$$

where m=1, ..., N(d).

In an operation 454, the number of supplemental labeled points $N_{SL}$ are selected from average distance matrix $AD_m$ by identifying the $N_{SL}$ data points having the smallest distance values in average distance matrix $AD_m$. The index i to the observation vector $x_i$ of partially labeled dataset 224 associated with each data point may be identified as part of the selection. Thus, a mapping between index i to the observation vector $x_i$ of partially labeled dataset 224 and each observation vector within each cluster indexed using m=1, ..., N(d) for d=1, ..., D, where D is a number of clusters defined in operation 448 may be stored for reference.

In an operation 456, a ratio of a largest label probability value relative to a second largest label probability value is computed for each of the selected $N_{SL}$ data points using $$\frac{P_a(t)}{P_b(t)},$$

where $P_a(t)$ represents a highest label probability value for a respective selected data point, and $P_b(t)$ represents a second highest label probability value for the respective selected data point.

In an operation 458, any of the selected $N_{SL}$ data points for which the computed ratio is less than or equal to the relevance threshold $\Delta$, $$\frac{P_a(t)}{P_b(t)} \leq \Delta,$$

are removed from the $N_{SL}$ data points resulting in $N_{SLU}$ data points such that $N_{SLU}=N_{SL}-N_R$, where $N_R$ is a number of the $N_{SL}$ data points that were removed, if any.

In an operation 460, the label associated with $P_a(t)$ for each remaining data point of the selected $N_{SL}$ data points is assigned to the $y_i$-variable (target) value of the associated observation vector $x_i$ and is updated in partially labeled dataset 224. As a result, l has been increased by $N_{SLU}$. Partially labeled dataset 224 may be sorted so that the newly labeled data points are included in point set $\chi=\{x_1, ..., x_l, x_{l+1}, ..., x_n\}$, where the observation vectors $x_i$ (i≤l) are labeled such that $y_i \in Q$, and the remaining observation vectors $x_i$ (l<i≤n) are unlabeled such that $y_i \notin Q$).

In an operation 462, label matrix Y is updated based on partially labeled dataset 224 updated in operation 460, and processing continue in operation 432 to reinitialize classification matrix F and update labels in partially labeled dataset 224.

Master labeling application 222 optimizes the selection of the labeled data by incorporating the information from the prior class distribution vector as a regularization term. As the prior information is used to calibrate the estimation, the classification accuracy is improved and the convergence is faster. For data with a large number of classes, the probability estimation for many classes may be very close to zero. For these classes, master labeling application 222 provides numerical stability for the computation of distance matrix Dis. Master labeling application 222 also supports partial regularization by only applying regularization to the classes where the prior information for that class is available. The prior information need not be provided when not known for some classes.

Master labeling application 222 applying operations in a single computing device and using a single thread also results in reduced computational complexity when compared to prior algorithms because the distance computation is not between all observation vectors but only those in the same cluster thus $O(N^2)$ is reduced to $O(N^2/D)$. Master labeling application 222 also selects the most informative samples in a low dimensional space with manifold learning and clustering, which not only reduces computational complexity but also ensures diversity of the selection of the labeled data to avoid unbalanced classes. Master labeling application 222 employs a local minimum average distance among clusters relying on an information theoretical measure to find the most informative data. As a result, the data samples with a maximum local density and high uncertainty are selected. Master labeling application 222 utilizes a relevance threshold as a measure of confidence in the label by computing the ratio of the highest value of the label distribution with the second highest value of the label distribution. Only if the confidence is sufficiently large that is exceeds a relevance threshold is the label considered labeled on a next iteration. Samples from different classes are likely to be present in the different clusters. Since the selection of the most informative data is based on the local minimum average distance in the clusters, the data is selected in a diverse manner that avoids selection of data from the same class that results in unbalanced classes. Diversity of the classes for labeled data is an important factor in an active learning problem.

When master device 102 is multithreaded, one or more operations of FIGS. 4A to 4B can be performed in parallel using a plurality of threads or a plurality of node devices. For example, operations 424 to 438 can be performed on separate threads with different subsets of the non-labeled observation vectors allocated to each thread and using the extracted supervised data provided to each thread. For example, local labeling application 312 may be used to create each locally labeled dataset of the one or more locally labeled datasets 318 and each classification matrix of the one or more classification matrices 320 from supervised data 314 and each associated unlabeled data subset of the one or more unlabeled data subsets 316. In operations 460 and 462, the updated partially labeled dataset 224 and updated supervised data 226 that results may be used to create each unlabeled data subset of the one or more unlabeled data subsets 316 and to update supervised data 314. Operation 440 may be performed by each thread or by a controller thread that receives the classification label distribution matrix F(t). Operation 448 may be performed by each thread or by a controller thread.

Figure 5:
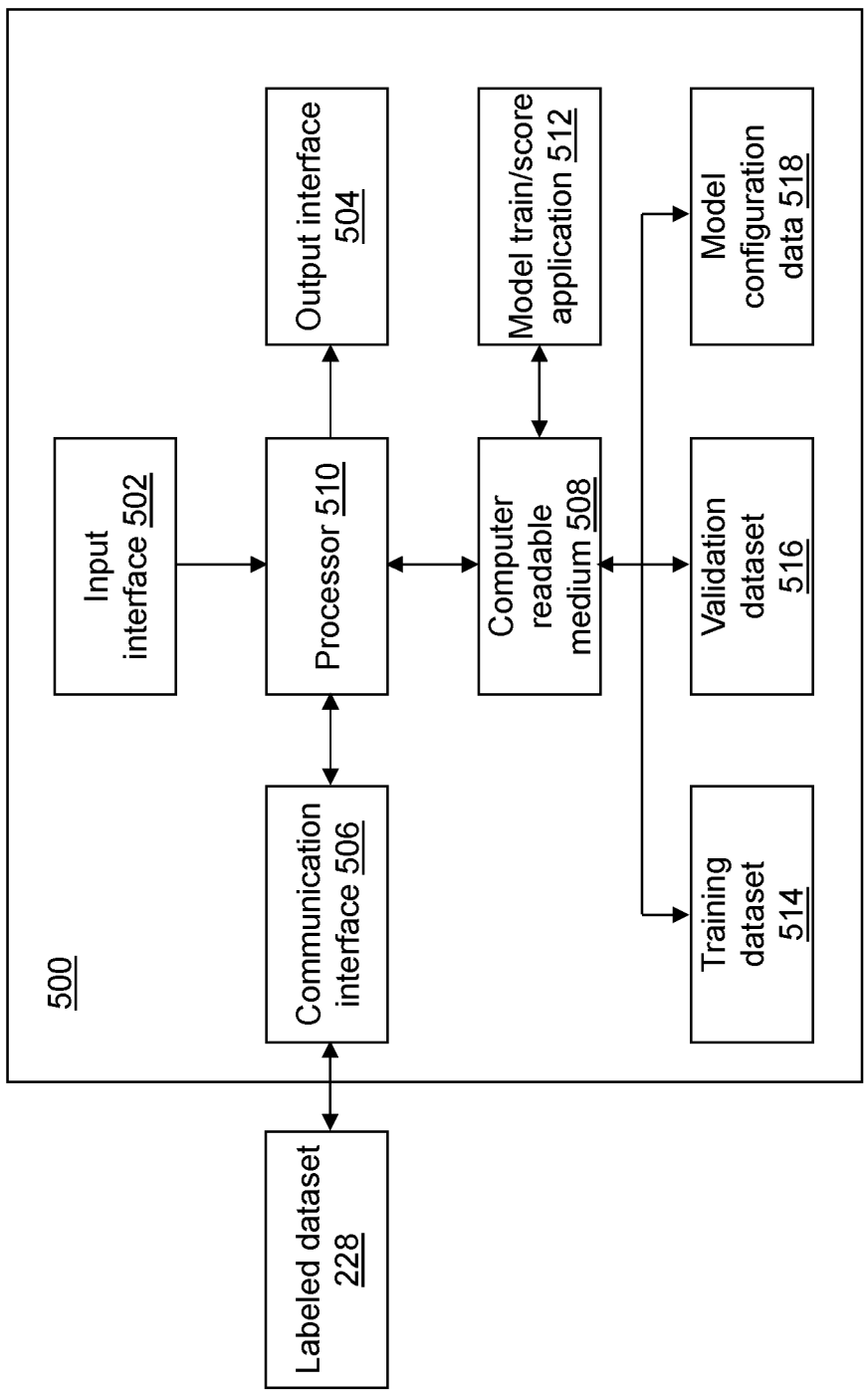
FIG. 5 depicts a block diagram of a model training device in accordance with an illustrative embodiment.

For illustration, referring to FIG. 5, a block diagram of a model training device 500 is shown in accordance with an example embodiment. Model training device 500 may include a third input interface 502, a third output interface 504, a third communication interface 506, a third computer-readable medium 508, a third processor 510, a model train/score application 512, a training dataset 514, a validation dataset 516, and model configuration data 518. Labeled dataset 228 is split into training dataset 514 and validation dataset 516 based on a selection of a percent of labeled dataset 228 to use for training with the remainder allocated to validation of the trained model, a selection of a cross validation option, etc.

Third input interface 502 provides the same or similar functionality as that described with reference to input interface 202 of master device 102 though referring to model training device 500. Third output interface 504 provides the same or similar functionality as that described with reference to output interface 204 of master device 102 though referring to model training device 500. Third communication interface 506 provides the same or similar functionality as that described with reference to communication interface 206 of master device 102 though referring to model training device 500. Data and messages may be transferred between model training device 500 and another computing device such as master device 102 using third communication interface 506. Third computer-readable medium 508 provides the same or similar functionality as that described with reference to computer-readable medium 208 of master device 102 though referring to model training device 500. Third processor 510 provides the same or similar functionality as that described with reference to processor 210 of master device 102 though referring to model training device 500.

Model train/score application 512 may be integrated with other analytic tools. As an example, model train/score application 512 may be part of an integrated data analytics software application and/or software architecture such as that offered by SAS Institute Inc. of Cary, N.C., USA. For example, model train/score application 512 may be part of SAS® Enterprise Miner™ developed and provided by SAS Institute Inc. of Cary, N.C., USA. Merely for further illustration, model train/score application 512 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA. Merely for illustration, model train/score application 512 may implement a model type that may be selected from "Decision Tree", "Factorization Machine", "Random Forest", "Gradient Boosting Tree", "Neural Network", "Support Vector Machine", etc.

The selected model type is trained using training dataset 514. Once trained, the trained model is scored using validation dataset 516. Once validated, the model configuration for the validated model is stored in model configuration data 518 for use in predicting results.

Figure 6:
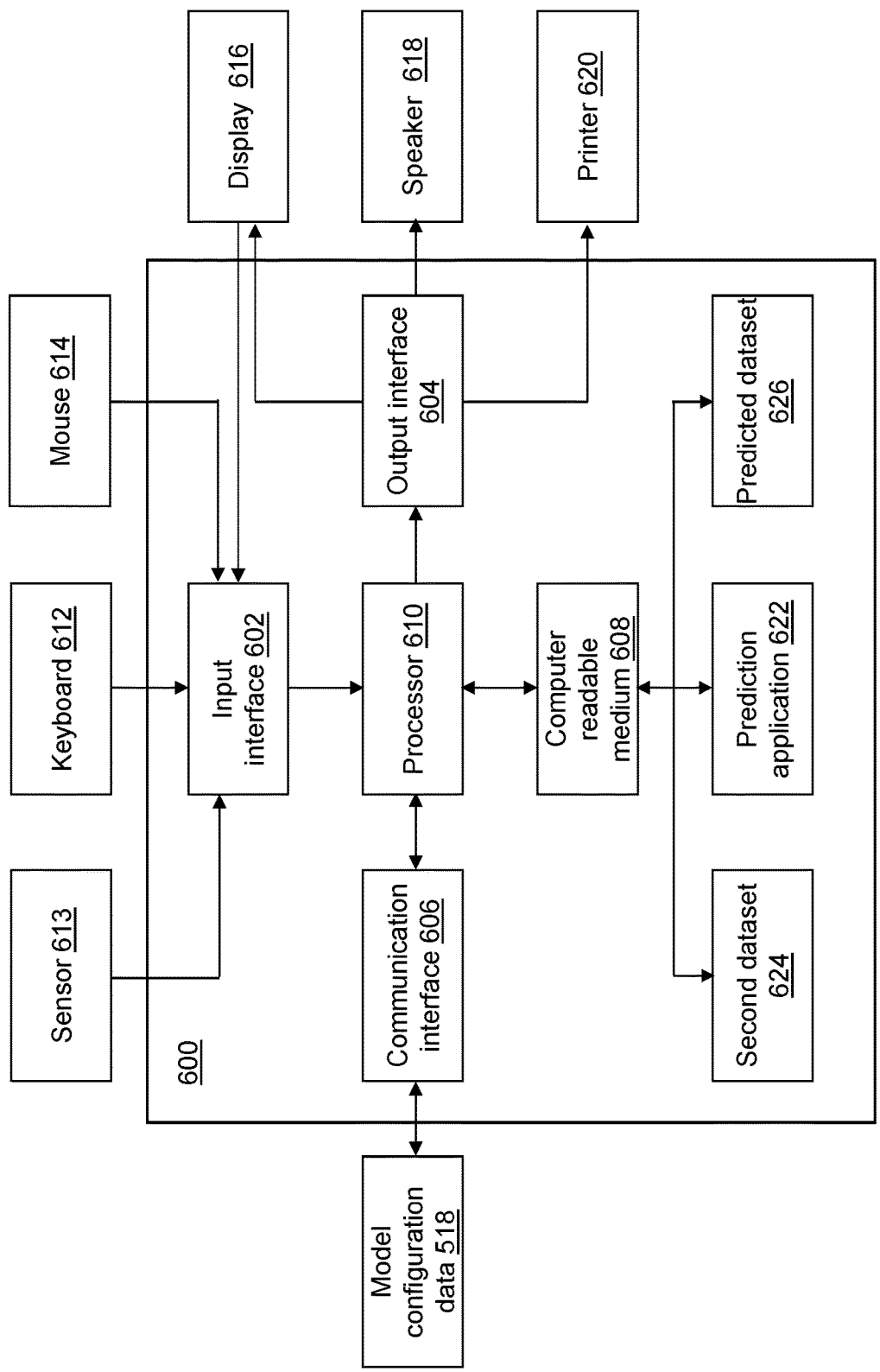
FIG. 6 depicts a block diagram of a prediction device in accordance with an illustrative embodiment.

Referring to FIG. 6, a block diagram of a prediction device 600 is shown in accordance with an illustrative embodiment. Prediction device 600 may include a fourth input interface 602, a fourth output interface 604, a fourth communication interface 606, a fourth non-transitory computer-readable medium 608, a fourth processor 610, a prediction application 622, a second dataset 624, and predicted dataset 626. Fewer, different, and/or additional components may be incorporated into prediction device 600. Prediction device 600 and training device 500 and/or master device 102 may be the same or different devices.

Fourth input interface 602 provides the same or similar functionality as that described with reference to input interface 202 of master device 102 though referring to prediction device 600. Fourth output interface 604 provides the same or similar functionality as that described with reference to output interface 204 of master device 102 though referring to prediction device 600. Fourth communication interface 606 provides the same or similar functionality as that described with reference to communication interface 206 of master device 102 though referring to prediction device 600. Data and messages may be transferred between prediction device 600 and training device 500 and/or master device 102 using fourth communication interface 606. Fourth computer-readable medium 608 provides the same or similar functionality as that described with reference to computer-readable medium 208 of master device 102 though referring to prediction device 600. Fourth processor 610 provides the same or similar functionality as that described with reference to processor 210 of master device 102 though referring to prediction device 600.

Prediction application 622 performs operations associated with classifying or predicting a characteristic of data stored in second dataset 624 and/or identifying outliers in second dataset 624 to support various data analysis functions as well as provide alert/messaging related to the classified data and/or identified outliers. Dependent on the type of data stored in labeled dataset 228 and second dataset 624, prediction application 622 may identify anomalies as part of process control, for example, of a manufacturing process, for machine condition monitoring, for example, an electrocardiogram device, for image classification, for intrusion detection, for fraud detection, etc. Some or all of the operations described herein may be embodied in prediction application 622. The operations may be implemented using hardware, firmware, software, or any combination of these methods.

Referring to the example embodiment of FIG. 6, prediction application 622 is implemented in software (comprised of computer-readable and/or computer-executable instructions) stored in fourth computer-readable medium 608 and accessible by fourth processor 610 for execution of the instructions that embody the operations of prediction application 622. Prediction application 622 may be written using one or more programming languages, assembly languages, scripting languages, etc. Prediction application 622 may be integrated with other analytic tools. As an example, prediction application 622 may be part of an integrated data analytics software application and/or software architecture such as that offered by SAS Institute Inc. of Cary, N.C., USA. For example, prediction application 622 may be part of SAS® Enterprise Miner™ developed and provided by SAS Institute Inc. of Cary, N.C., USA. Merely for further illustration, prediction application 622 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 622 further may be performed by an event stream processing engine (ESPE).

Prediction application 622, model train/score application 412, and/or master labeling application 222 may be the same or different applications that are integrated in various manners to fully label partially labeled dataset 224 and execute a predictive model type using labeled dataset 228 and/or second dataset 624 in a single computing device or a plurality of distributed computing devices.

Prediction application 622 may be implemented as a Web application. Prediction application 622 may be integrated with other system processing tools to automatically process data generated as part of operation of an enterprise, to classify data in the processed data, to identify any outliers in the processed data, and/or to provide a warning or alert associated with the data classification and/or outlier identification using fourth input interface 602, fourth output interface 604, and/or fourth communication interface 606 so that appropriate action can be initiated in response. For example, a warning or an alert may be presented using a second display 616, a second speaker 618, a second printer 620, etc. or sent to one or more computer-readable media, display, speaker, printer, etc. of a distributed computing system.

Partially labeled dataset 224 and second dataset 624 may be generated, stored, and accessed using the same or different mechanisms. Similar to partially labeled dataset 224, second dataset 624 may include a plurality of rows and a plurality of columns with the plurality of rows referred to as observations or records, and the columns referred to as variables that are associated with an observation. Second dataset 624 may be transposed.

Similar to partially labeled dataset 224, second dataset 624 may be stored on fourth computer-readable medium 608 or on one or more computer-readable media of node devices 104 and accessed by prediction device 600 using fourth communication interface 606. Data stored in second dataset 624 may be a sensor measurement or a data communication value, for example, from a sensor 613, may be generated or captured in response to occurrence of an event or a transaction, generated by a device such as in response to an interaction by a user with the device, for example, from a second keyboard 612 or a second mouse 614, etc. The data stored in second dataset 624 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 624 may be captured at different time points periodically, intermittently, when an event occurs, etc. One or more columns may include a time value. Similar to partially labeled dataset 224, data stored in second dataset 624 may be generated as part of the IoT, and some or all data may be pre- or post-processed by an ESPE.

Similar to partially labeled dataset 224, second dataset 624 may be stored in various compressed formats such as a coordinate format, a compressed sparse column format, a compressed sparse row format, etc. Second dataset 624 further may be stored using various structures as known to those skilled in the art including a file system, a relational database, a system of tables, a structured query language database, etc. on prediction device 600 and/or on node devices 104. Prediction device 600 and/or master device 102 may coordinate access to second dataset 624 that is distributed across node devices 104. For example, second dataset 624 may be stored in a cube distributed across a grid of computers as understood by a person of skill in the art. As another example, second dataset 624 may be stored in a multi-node Hadoop® cluster. As another example, second dataset 624 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 624.

Figure 7:
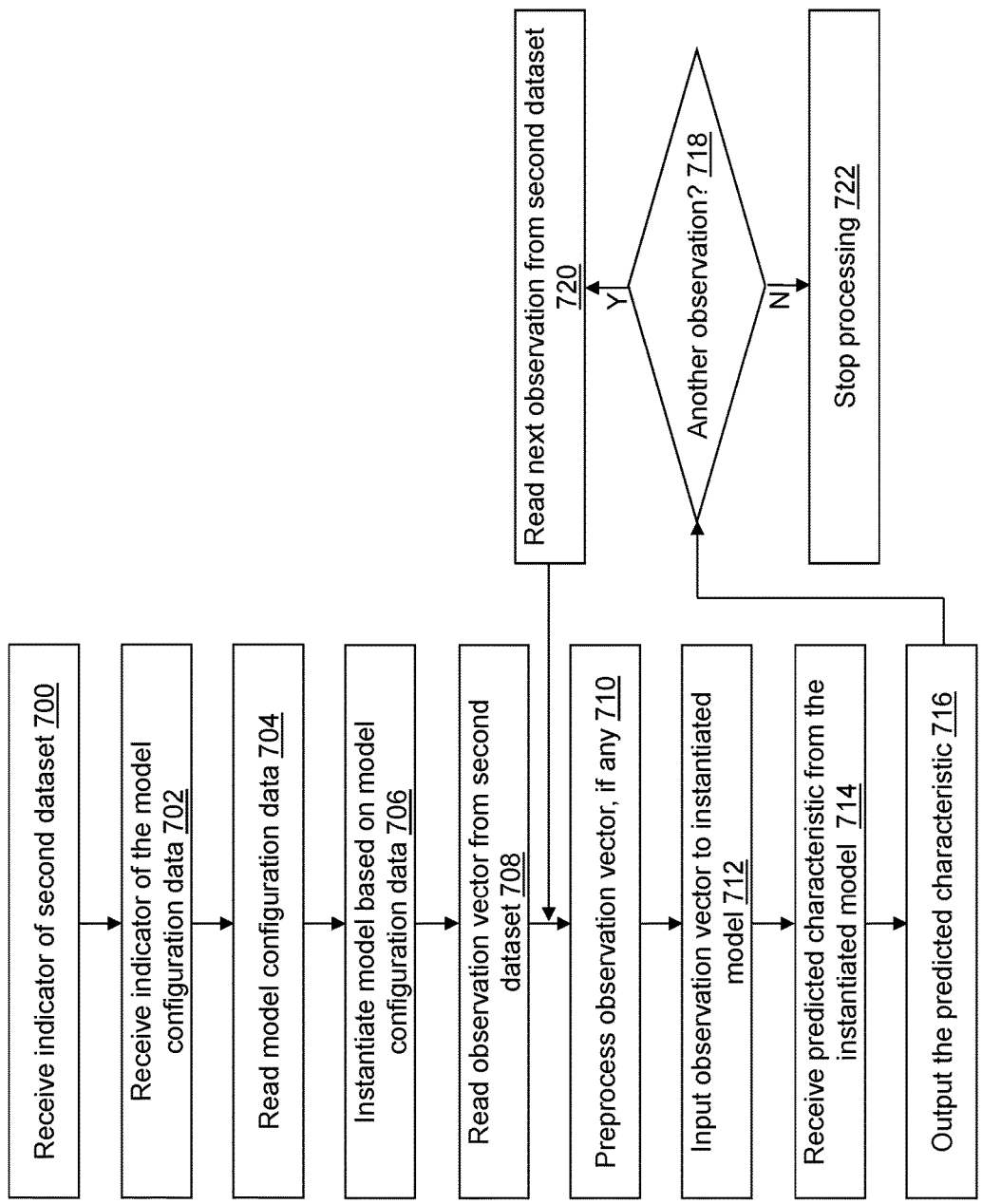
FIG. 7 depicts a flow diagram illustrating examples of operations performed by the prediction device of FIG. 6 in accordance with an illustrative embodiment.

Referring to FIG. 7, example operations of prediction application 622 are described. Additional, fewer, or different operations may be performed depending on the embodiment of prediction application 622. The order of presentation of the operations of FIG. 7 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 700, a fourteenth indicator may be received that indicates second dataset 624. For example, the fourteenth indicator indicates a location and a name of second dataset 624. As an example, the fourteenth indicator may be received by prediction application 622 after selection from a user interface window or after entry by a user into a user interface window. In an alternative embodiment, second dataset 624 may not be selectable. For example, a most recently created dataset may be used automatically. As another example, second dataset 624 may be provided automatically as part of integration between prediction application 622, model train/score application 412, and/or master labeling application 222.

In an operation 702, a fifteenth indicator may be received that indicates model configuration data 518. For example, the fifteenth indicator indicates a location and a name of model configuration data 518. As an example, the fifteenth indicator may be received by prediction application 622 after selection from a user interface window or after entry by a user into a user interface window. In an alternative embodiment, model configuration data 518 may not be selectable. For example, most recently created model configuration data may be used automatically. As another example, model configuration data 518 may be provided automatically as part of integration between prediction application 622, model train/score application 412, and/or master labeling application 222.

In an operation 704, a model description is read from model configuration data 518.

In an operation 706, a model is instantiated with information read from model configuration data 518. For example, the type of model, its hyperparameters, and other characterizing elements are read and used to instantiate a predictive model.

In an operation 708, an observation vector is read from second dataset 624. In an alternative embodiment, the observation vector may be streamed to prediction application 622 of prediction device 600.

In an operation 710, the observation vector is pre-processed, if any pre-processing is performed.

In an operation 712, the optionally pre-processed observation vector is input to the instantiated predictive model.

In an operation 714, an output of the instantiated predictive model is received. The output may indicate a predicted characteristic of the observation vector.

In an operation 716, the predicted characteristic may be output, for example, by storing the predicted characteristic with the observation vector to predicted dataset 626. In addition, or in the alternative, the predicted characteristic may be presented on second display 616, printed on second printer 620, a message including the predicted characteristic may be sent to another computing device using fourth communication interface 606, an alarm or other alert signal may be sounded through second speaker 618, etc.

In an operation 718, a determination is made concerning whether or not second dataset 624 includes another observation vector. When second dataset 624 includes another observation vector, processing continues in an operation 720. When second dataset 624 does not include another observation vector, processing continues in an operation 722.

In operation 720, a next observation vector is read from second dataset 624, and processing continues in operation 710. In an alternative embodiment, the next observation vector may be streamed to prediction application 622 of prediction device 600 until the ESPE is disconnected.

In operation 722, processing stops and cleanup is performed as needed.

There are applications for prediction application 622, model train/score application 412, and/or master labeling application 222 in many areas such as process control and equipment health monitoring, image processing and classification, data segmentation, data analysis, etc. Model train/score application 412 defines models that may be decision tree models, random forest models, gradient boost models, neural network models, support vector machine models, factorization machine models, etc.

Master labeling application 222 creates labeled dataset 228 to label each observation vector included in partially labeled dataset 224. Labeled dataset 228 further may be used to define prediction application 622 using model train/score application 512, for example, to automatically predict whether or not a new image does or does not include a tumor/anomaly or automatically classify a new image as including a tumor/anomaly. Labeled dataset 228 may be split into training dataset 512 and validation dataset 516, which are input to model train/score application 512, to train and to validate a predictive model stored in model configuration data 518. Second dataset 624 that includes unlabeled images is input to the predictive model implemented by prediction application 622 to create predicted dataset 626 that includes a prediction of whether or not a new image does or does not include a tumor/anomaly.

Data labeling system 100 can be applied to computer vision, machine learning, pattern recognition, etc. In the application of medical imaging diagnosis, there may be a large number of unlabeled medical images that are distributed due to their geographic locations. Data labeling system 100 can select and label the most informative labeled images in a parallel fashion.

In a first experiment, master labeling application 222 was used with a first dataset named the UCI Iris dataset as partially labeled dataset 224. The performance resulting from use of master labeling application 222 was compared to the performance using a previous labeling algorithm described in U.S. patent application Ser. No. 16/108,293. The performance was measured by computing a precision value. Precision can be defined as $$\text{precision} = \frac{tp}{tp + fp},$$

where tp is the number of true positives and fp is the number of false positives.

The first dataset included 150 samples, n=150, with three classes, c=3. On a first iteration, partially labeled dataset 224 included two human labeled samples. For each subsequent iteration, three additional samples were selected such that $N_{SL}=3$. Each sample included four dimensions. Prior class distribution vector p was set to define a uniform distribution as {0.33, 0.33, 0.33}. The prior weight parameter value λ was set to 0.01. The computed precision is shown in Table I below.

TABLE I

| Iteration Number | Number of labeled data samples | Master labeling application 222 | The previous labeling algorithm described in U.S. Patent Application No. 16/108,293 |
|---|---|---|---|
| 1 | 2 | 0.49 | 0.49 |
| 2 | 5 | 0.51 | 0.50 |
| 3 | 8 | 0.98 | 0.93 |
| 4 | 11 | 0.98 | 0.93 |

Master labeling application 222 provided a better classification performance of 5% in terms of precision after the third iteration of operation 440 because it incorporated the prior information into the label selection process.

In a second experiment, master labeling application 222 was used with a second dataset of handwritten digits as partially labeled dataset 224. The first dataset included 1300 samples, n=1300, with ten classes, c=10, that designate one of the handwritten digits from "0" to "9". On a first iteration, partially labeled dataset 224 included 20 human labeled samples. For each subsequent iteration, five additional samples were selected such that $N_{SL},=5$. Each sample included 64 dimensions. Prior class distribution vector p was set to define a uniform distribution as {0.1, 0.1, 0.1, 0.1, 0.1, 0.1, 0.1, 0.1, 0.1, 0.1}. The prior weight parameter value λ was set to 0.2. The radial basis kernel function was used as the kernel function with a gamma parameter value of 0.25. K-means clustering was used as the clustering algorithm with the number of clusters selected as 6. The computed precision is shown in Table II below.

TABLE II

| Iteration Number | Number of labeled data samples | Master labeling application 222 | The previous labeling algorithm described in U.S. Patent Application No. 16/108,293 |
|---|---|---|---|
| 1 | 20 | 0.76 | 0.76 |
| 2 | 25 | 0.76 | 0.77 |
| 3 | 30 | 0.93 | 0.78 |
| 4 | 35 | 0.93 | 0.90 |
| 5 | 40 | 0.93 | 0.91 |
| 6 | 45 | 0.93 | 0.91 |

Master labeling application 222 provided a faster convergence and a better classification performance of 2% in terms of precision after the third iteration of operation 440 because it incorporated the prior information into the label selection process. When the number of labeled data samples reached 30, the jump in the performance using master labeling application 222 occurred because the initial labeled data (20 samples) included only nine of the ten classes. The class associated with the numerical digit "4" was not selected until the third iteration. Until the numerical digit "4" was selected, the precision for class 4 was zero, which reduced the average precision for the 10 class classification problem. Once the numerical digit "4" was added into the labeled set in iteration 3, the precision for class 4 rose from 0 to 0.97. Class 4 was also selected in iteration 3 using the previous labeling algorithm described in U.S. patent application Ser. No. 16/108,293. The initial labeled data was randomly selected and both algorithms were run 10 times with different labeled data. The average precision computed for the 10 runs is shown in Table II. The performance using master labeling application 222 is much smoother (the accuracy is increasing slowly instead of in a big jump between two iterations) as the new class of the labels can be added in different iterations with different runs. Master labeling application 222 consistently outperformed the previous labeling algorithm described in U.S. patent application Ser. No. 16/108,293 in terms of the average precision for each iteration.

In a third experiment, master labeling application 222 was used with the second dataset of handwritten digits as partially labeled dataset 224. The third experiment was the same as the second experiment except that the prior class distribution vector p was set to define a partial multinomial distribution as {0, 0.12, 0.12, 0.12, 0.12, 0.12, 0.12, 0.12, 0.12, 0}. The computed precision is shown in Table III below.

TABLE III

| Iteration Number | Number of labeled data samples | Master labeling application 222 with partial distribution | The previous labeling algorithm described in U.S. Patent Application No. 16/108,293 |
|---|---|---|---|
| 1 | 20 | 0.65 | 0.65 |
| 2 | 25 | 0.74 | 0.73 |
| 3 | 30 | 0.79 | 0.78 |
| 4 | 35 | 0.87 | 0.85 |
| 5 | 40 | 0.91 | 0.90 |

Even with only partial prior information, master labeling application 222 consistently outperformed the previous labeling algorithm described in U.S. patent application Ser. No. 16/108,293 in terms of the average precision for each iteration.

Again, master labeling application 222 described herein requires fewer iterations to achieve the same accuracy as the previous labeling algorithm described in U.S. patent application Ser. No. 16/108,293. Master labeling application 222 can save even more execution time using parallel processing in the stage of selecting the most informative data samples. The results described herein were performed using a single computer and a single thread.

Master labeling application 222 can be implemented as part of a machine learning application. Master labeling application 222 lowers the cost associated with training the object labeling process because fewer samples need to be labeled by a human while achieving improved accuracy and precision.

By distributing the labeling task across a plurality of node devices 104, the computation time can be further significantly reduced while maintaining the obtained accuracy. Master labeling application 222 in combination with local labeling application 312 perform labeling using a plurality of threads and/or a plurality of computing devices. As a result, data labeling system 100 improves an execution time significantly compared to a single threaded system as described herein.

Data labeling system 100 further supports the improved labeling accuracy performance in a faster manner using the plurality of node devices 300 that perform operations on their portion of the unlabeled observation vectors in partially labeled dataset 224. Supervised data 226 is used at all of the computing devices of the plurality of node devices 300. The portion of the unlabeled observation vectors in partially labeled dataset 224 may be overlapping or non-overlapping with that stored at other node devices of the plurality of node devices 300, as described in U.S. Patent Publication No. 2018/0053071.

Supervised learning requires that the target (dependent) variable y be labeled in training data so that a model can be built to predict the label of new unlabeled data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Data labeling system 100 solves this problem by providing a cost effective, accurate, and fast process for labeling unlabeled data so that partially labeled dataset 224 becomes labeled dataset 228, which includes labels for all of the data. Master labeling application 222 described herein provides superior performance over the algorithms described in U.S. Pat. No. 9,792,562, U.S. Patent Publication No. 2018/0053071, and U.S. patent application Ser. No. 16/108,293 in terms of lower computational complexity, faster convergence, and lower training cost due to fewer human labeled observations while achieving better results. Labeled dataset 228 provides observation vectors for training a predictive model that previously would have been discarded resulting in improved models and more accurate predictions as shown in the results presented above.

Implementing some examples of the present disclosure at least in part by using the above-described machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a label set, wherein the label set defines permissible values for a target variable;
   identify supervised data that includes a labeled subset of a plurality of observation vectors, wherein each of the labeled subset of the plurality of observation vectors has one of the permissible values of the target variable;
   identify an unlabeled subset of the plurality of observation vectors that includes the plurality of observation vectors not included in the identified supervised data;
   (a) compute a converged classification matrix based on the identified supervised data and the identified unlabeled subset of the plurality of observation vectors that defines a label probability for each permissible value defined in the label set for each observation vector of the identified unlabeled subset of the plurality of observation vectors, wherein the converged classification matrix is further computed using a prior class distribution matrix that includes a row for each observation vector of the plurality of observation vectors, where each column is associated with a single permissible value of the label set, and a cell value in each column is a likelihood that each associated permissible value of the label set occurs based on prior class distribution information;
   (b) for each observation vector of the unlabeled subset of the plurality of observation vectors, select the value of the target variable associated with a maximum label probability value identified from the computed, converged classification matrix;
   (c) compute a weighted classification label distribution matrix from the computed, converged classification matrix using the likelihood that each permissible value of the label set occurs based on the prior class distribution information;
   (d) for each observation vector of the plurality of observation vectors, compute a distance value between each pair of the plurality of observation vectors using a distance function and the computed, weighted classification label distribution matrix;
   (e) select observation vectors from the identified unlabeled subset of the plurality of observation vectors that have minimum values for the computed distance value, wherein a predefined number of observation vectors is selected;
   (f) update the supervised data to include the selected observation vectors with the value of the target variable selected in (b) for the respective selected observation vector;
   (g) remove the selected observation vectors from the unlabeled subset of the plurality of observation vectors;
   (h) repeat (a) and (b); and
   output the value of the target variable for each observation vector of the plurality of observation vectors to a labeled dataset.

2. The non-transitory computer-readable medium of claim 1, further comprising, after (b) and before (c), computer-readable instructions that when executed by the computing device cause the computing device to reduce a number of permissible values for the target variable included in the label set using a manifold learning algorithm thereby reducing a number of dimensions of the computed, weighted classification matrix, wherein (c) and (d) use the reduced, computed, weighted classification matrix.

3. The non-transitory computer-readable medium of claim 2, wherein the manifold learning algorithm is selected from one or more of the group consisting of a t-distributed stochastic neighbor embedding algorithm, a principal component analysis algorithm, and a linear discriminant analysis algorithm.

4. The non-transitory computer-readable medium of claim 2, wherein the weighted classification label distribution matrix is computed using $P(i,j)=\Sigma_{j=1}^{c}[(1-\lambda)F_{ij}(t)+\lambda p(j)]$, where $F_{ij}(t)$ is the computed, converged classification matrix, $\lambda$ is a prior weight parameter value, and $p(j)$ is the likelihood that each permissible value of the label set occurs, and c is the reduced number of dimensions.

5. The non-transitory computer-readable medium of claim 1, further comprising, after (b) and before (c), computer-readable instructions that when executed by the computing device cause the computing device to:
   assign each observation vector of the plurality of observation vectors to a cluster using a clustering algorithm based on the computed, converged classification matrix;
   wherein the distance value computed in (d) is between each pair of the plurality of observation vectors assigned to a common cluster.

6. The non-transitory computer-readable medium of claim 5, wherein the clustering algorithm is selected from one or more of the group consisting of a k-means clustering algorithm, a k-median clustering algorithm, and a mean shift clustering algorithm.

7. The non-transitory computer-readable medium of claim 5, further comprising, after (d) and before (e), computer-readable instructions that when executed by the computing device cause the computing device to compute an average distance value for each observation vector of the plurality of observation vectors based on a subset of the plurality of observation vectors assigned to the common cluster of a respective observation vector of the plurality of observation vectors, wherein (e) uses the computed, average distance value.

8. The non-transitory computer-readable medium of claim 1, further comprising, after (g) and before (h), computer-readable instructions that when executed by the computing device cause the computing device to repeat (a) to (g) a predefined number of times.

9. The non-transitory computer-readable medium of claim 1, further comprising, after (e) and before (f), computer-readable instructions that when executed by the computing device cause the computing device to, for each selected observation vector:
- select a highest label probability value for the respective selected observation vector from the computed, converged classification matrix;
- select a second highest label probability value for the respective selected observation vector from the computed, converged classification matrix;
- compute a ratio of the selected highest probability label value and the selected second highest probability label value;
- compare the computed ratio to a predefined relevance threshold; and
- remove the respective selected observation vector from the selected observation vectors when the computed ratio is less than or equal to the predefined relevance threshold.

10. The non-transitory computer-readable medium of claim 1, wherein the converged classification matrix is computed using a plurality of threads.

11. The non-transitory computer-readable medium of claim 1, wherein (a) is computed using a plurality of threads.

12. The non-transitory computer-readable medium of claim 1, wherein (b) is computed using a plurality of threads.

13. The non-transitory computer-readable medium of claim 1, wherein (c) is performed using a plurality of threads.

14. The non-transitory computer-readable medium of claim 1, wherein (d) and (e) are performed using a plurality of threads.

15. The non-transitory computer-readable medium of claim 1, wherein computing the converged classification matrix comprises:
- compute an affinity matrix using a kernel function, the identified unlabeled subset of the plurality of observation vectors, and the identified supervised data;
- compute a diagonal matrix by summing each row of the computed affinity matrix, wherein the sum of each row is stored in a diagonal of the row with zeroes in remaining positions of the row;
- compute a normalized distance matrix using the computed affinity matrix and the computed diagonal matrix; and
- define a label matrix using the value of the target variable of each of the identified unlabeled subset of the plurality of observation vectors.

16. The non-transitory computer-readable medium of claim 15, wherein a classification matrix is initialized as the defined label matrix.

17. The non-transitory computer-readable medium of claim 16, wherein the classification matrix is converged using $F(t+1)=\alpha SF(t)+\lambda U+(1-\alpha)Y$, where $F(t+1)$ is a next classification matrix, $\alpha$ is a relative weighting value, S is the computed, normalized distance matrix, $F(t)$ is the classification matrix, Y is the defined, label matrix, t is an iteration number, $\lambda$ is a prior weight parameter value, and U is the prior class distribution matrix.

18. The non-transitory computer-readable medium of claim 17, wherein the classification matrix is converged when a predefined number of iterations of computing $F(t+1)=\alpha SF(t)+\lambda U+(1-\alpha)Y$ is complete.

19. The non-transitory computer-readable medium of claim 15, wherein the affinity matrix is defined as $$W_{ij} = \exp\frac{-\|x_i - x_j\|^2}{2s^2} \text{ if } i \neq j \text{ and } W_{ii} = 0,$$

where s is a Gaussian bandwidth parameter defined for the kernel function, x is an observation vector of the identified unlabeled subset of the plurality of observation vectors, $i=1, \ldots, n$, $j=1, \ldots, n$, and n is a number of vectors of the identified unlabeled subset of the plurality of observation vectors.

20. The non-transitory computer-readable medium of claim 15, wherein the diagonal matrix is defined as $D_{ii}=\Sigma^n_{j=1}W_{ij}$ and $D_{ij}=0$ if $i \neq j$, where W is the computed affinity matrix, $i=1, \ldots, n$, and n is a number of vectors of the identified unlabeled subset of the plurality of observation vectors.

21. The non-transitory computer-readable medium of claim 15, wherein the normalized distance matrix is defined as $S=D^{-1/2}WD^{-1/2}$, where W is the computed affinity matrix and D is the computed diagonal matrix.

22. The non-transitory computer-readable medium of claim 15, wherein the label matrix is defined as $Y_{ik}=1$ if $x_i$ is labeled as $y_i=k$; otherwise, $Y_{ik}=0$, where $x_i$ is an observation vector of the identified unlabeled subset of the plurality of observation vectors, $i=1, \ldots, n$, n is a number of vectors of the identified unlabeled subset of the plurality of observation vectors, $k=1, \ldots, c$, and c is a number of the permissible values of the label set.

23. The non-transitory computer-readable medium of claim 1, wherein the weighted classification label distribution matrix is computed using $P(i,j)=\Sigma^c_{j=1}[(1-\lambda)F_{ij}(t)+\lambda p(j)]$, where $F_{ij}(t)$ is the computed, converged classification matrix, $\lambda$ is a prior weight parameter value, and p(j) is the likelihood that each permissible value of the label set occurs, and c is a number of the permissible values of the label set.

24. The non-transitory computer-readable medium of claim 23, wherein the distance function is a symmetric Kullback-Leibler divergence function.

25. The non-transitory computer-readable medium of claim 24, wherein the distance value is computed using $$Dis_{mkd} = \sum_{j=1}^{c} P_{kj}\log\frac{P_{kj}}{P_{mj}} + \sum_{j=1}^{c} P_{mj}\log\frac{P_{mj}}{P_{kj}}$$

where $m=1, \ldots, n$, $k=1, \ldots, n$, and n is a number of vectors of the identified unlabeled subset of the plurality of observation vectors.

26. The non-transitory computer-readable medium of claim 1, comprising computer-readable instructions that further cause the computing device to train a predictive model with the labeled dataset.

27. The non-transitory computer-readable medium of claim 1, comprising computer-readable instructions that further cause the computing device to:
- divide the labeled dataset into a training dataset and a validation dataset;
- train a predictive model with the training dataset; and
- validate the trained predictive model with the validation dataset.

28. The non-transitory computer-readable medium of claim 27, comprising computer-readable instructions that further cause the computing device to:
- receive an indicator of a dataset that includes a second plurality of observation vectors, wherein the value of the permissible values of the target variable is not defined for the second plurality of observation vectors; and execute the validated predictive model with each observation vector of the second plurality of observation vectors to predict the value of the target variable for each observation vector of the second plurality of observation vectors.

29. A computing device comprising:

a processor; and a non-transitory computer-readable medium operably coupled to the processor, the computer-readable medium having computer-readable instructions stored thereon that, when executed by the processor, cause the computing device to read a label set, wherein the label set defines permissible values for a target variable;

identify supervised data that includes a labeled subset of a plurality of observation vectors, wherein each of the labeled subset of the plurality of observation vectors has one of the permissible values of the target variable;

identify an unlabeled subset of the plurality of observation vectors that includes the plurality of observation vectors not included in the identified supervised data;

(a) compute a converged classification matrix based on the identified supervised data and the identified unlabeled subset of the plurality of observation vectors that defines a label probability for each permissible value defined in the label set for each observation vector of the identified unlabeled subset of the plurality of observation vectors, wherein the converged classification matrix is further computed using a prior class distribution matrix that includes a row for each observation vector of the plurality of observation vectors, where each column is associated with a single permissible value of the label set, and a cell value in each column is a likelihood that each associated permissible value of the label set occurs based on prior class distribution information;

(b) for each observation vector of the unlabeled subset of the plurality of observation vectors, select the value of the target variable associated with a maximum label probability value identified from the computed, converged classification matrix;

(c) compute a weighted classification label distribution matrix from the computed, converged classification matrix using the likelihood that each permissible value of the label set occurs based on the prior class distribution information;

(d) for each observation vector of the plurality of observation vectors, compute a distance value between each pair of the plurality of observation vectors using a distance function and the computed, weighted classification label distribution matrix;

(e) select observation vectors from the identified unlabeled subset of the plurality of observation vectors that have minimum values for the computed distance value, wherein a predefined number of observation vectors is selected;

(f) update the supervised data to include the selected observation vectors with the value of the target variable selected in (b) for the respective selected observation vector;

(g) remove the selected observation vectors from the unlabeled subset of the plurality of observation vectors;

(h) repeat (a) and (b); and output the value of the target variable for each observation vector of the plurality of observation vectors to a labeled dataset.

30. A method of automatically classifying an observation vector, the method comprising:

reading, by a computing device, a label set, wherein the label set defines permissible values for a target variable;

identifying, by the computing device, supervised data that includes a labeled subset of a plurality of observation vectors, wherein each of the labeled subset of the plurality of observation vectors has one of the permissible values of the target variable;

identifying, by the computing device, an unlabeled subset of the plurality of observation vectors that includes the plurality of observation vectors not included in the identified supervised data;

(a) computing, by the computing device, a converged classification matrix based on the identified supervised data and the identified unlabeled subset of the plurality of observation vectors that defines a label probability for each permissible value defined in the label set for each observation vector of the identified unlabeled subset of the plurality of observation vectors, wherein the converged classification matrix is further computed using a prior class distribution matrix that includes a row for each observation vector of the plurality of observation vectors, where each column is associated with a single permissible value of the label set, and a cell value in each column is a likelihood that each associated permissible value of the label set occurs based on prior class distribution information;

(b) for each observation vector of the unlabeled subset of the plurality of observation vectors, selecting, by the computing device, the value of the target variable associated with a maximum label probability value identified from the computed, converged classification matrix;

(c) computing, by the computing device, a weighted classification label distribution matrix from the computed, converged classification matrix using the likelihood that each permissible value of the label set occurs based on the prior class distribution information;

(d) for each observation vector of the plurality of observation vectors, computing, by the computing device, a distance value between each pair of the plurality of observation vectors using a distance function and the computed, weighted classification label distribution matrix;

(e) selecting, by the computing device, observation vectors from the identified unlabeled subset of the plurality of observation vectors that have minimum values for the computed distance value, wherein a predefined number of observation vectors is selected;

(f) updating, by the computing device, the supervised data to include the selected observation vectors with the value of the target variable selected in (b) for the respective selected observation vector;

(g) removing, by the computing device, the selected observation vectors from the unlabeled subset of the plurality of observation vectors;

(h) repeating, by the computing device, (a) and (b); and outputting, by the computing device, the value of the target variable for each observation vector of the plurality of observation vectors to a labeled dataset.

* * * * *

UNITED STATES PATENT AND TRADEMARK OFFICE
CERTIFICATE OF CORRECTION

PATENT NO. : 10,354,204 B2
APPLICATION NO. : 16/162794
DATED : July 16, 2019
INVENTOR(S) : Xu Chen et al.

It is certified that error appears in the above-identified patent and that said Letters Patent is hereby corrected as shown below:

In the Specification

Column 16, Line 59:
Delete the phrase "$D_{ii} = \Sigma_{j=1}^{n} W_{ij}$" and replace with --$D_{ii} = \Sigma_{j=1}^{n} W_{ij}$--.

Column 18, Lines 49-50:
Delete the phrase "$P(i,j) = \Sigma_{j=1}^{c'}[(1-\lambda)F_{ij}(t) + \lambda p(j)]$," and replace with
--$P(i,j) = \Sigma_{j=1}^{c'}[(1-\lambda)F_{ij}(t) + \lambda p(j)]$,--.

In the Claims

Claim 4, Column 30, Line 29:
Delete the phrase "$P(i,j) = \Sigma_{j=1}^{c}[(1-\lambda)F_{ij}(t) + \lambda p(j)]$," and replace with
--$P(i,j) = \Sigma_{j=1}^{c}[(1-\lambda)F_{ij}(t) + \lambda p(j)]$,--.

Claim 20, Column 32, Line 9:
Delete the phrase "$D_{ii} = \Sigma^{n}_{j=1} W_{ij}$" and replace with --$D_{ii} = \Sigma_{j=1}^{n} W_{ij}$--.

Claim 23, Column 32, Lines 28-29:
Delete the phrase "$P(i,j) = \Sigma^{c}_{j=1}[(1-\lambda)F_{ij}(t) + \lambda p(j)]$," and replace with
--$P(i,j) = \Sigma_{j=1}^{c}[(1-\lambda)F_{ij}(t) + \lambda p(j)]$,--.

Signed and Sealed this
Nineteenth Day of November, 2019

Andrei Iancu
*Director of the United States Patent and Trademark Office*